(12) United States Patent
Ariturk et al.

(10) Patent No.: US 11,001,287 B2
(45) Date of Patent: May 11, 2021

(54) CART SYSTEM FOR SECURING AND TRANSPORTING A PORTABLE TOOL

(71) Applicants: SAINT-GOBAIN ABRASIVES, INC., Worcester, MA (US); SAINT-GOBAIN ABRASIFS, Conflans-Sainte-Honorine (FR)

(72) Inventors: Selim Ariturk, Mecleuves (FR); Paul S. Edwards, Flowery Branch, GA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 16/743,238

(22) Filed: Jan. 15, 2020

(65) Prior Publication Data
US 2020/0255045 A1 Aug. 13, 2020

Related U.S. Application Data

(60) Provisional application No. 62/793,566, filed on Jan. 17, 2019.

(51) Int. Cl.
*B62B 3/02* (2006.01)
*B62B 3/04* (2006.01)
*B62B 3/12* (2006.01)

(52) U.S. Cl.
CPC .................. *B62B 3/02* (2013.01); *B62B 3/04* (2013.01); *B62B 3/12* (2013.01); *B62B 2202/48* (2013.01); *B62B 2206/003* (2013.01)

(58) Field of Classification Search
CPC .... B62B 3/02; B62B 3/04; B62B 3/12; B62B 2202/48; B62B 2206/003
See application file for complete search history.

(56) References Cited

U.S. PATENT DOCUMENTS 2,673,725 A * 3/1954 Coates ................... B28D 1/045
299/39.3
2,765,822 A * 10/1956 Smith ................. B27B 17/0091
30/379

(Continued)

FOREIGN PATENT DOCUMENTS

CN 101269527 A 9/2008
CN 101269527 B 9/2012

(Continued)

OTHER PUBLICATIONS

International Search Report and Written Opinion for PCT Application No. PCT/US2020/013624, dated May 13, 2020, 10 pgs.

(Continued)

*Primary Examiner* — Bryan A Evans
(74) *Attorney, Agent, or Firm* — Abel Schillinger, LLP; Joseph Sullivan

(57) ABSTRACT

A cart system may include a mounting bracket removably attachable to a cart and configured to receive a portable tool. The mounting bracket can include retainers to engage a front portion of the portable tool, and a clamp assembly rotationally attached to the mounting bracket that can engage a rear portion of the portable tool when the clamp assembly is in a locked position, thereby securing the portable tool to the mounting bracket. A cart system may include a rotatable arm with a wheel on a first end and rotationally attached to a cart at a second end. A circular disk having a first pattern fixed to the arm and a moveable plate with a recess having a second pattern that mates with the first pattern, the plate being moveably attached to the cart. The disk can selectively engage the recess to selectively restrict rotation of the arm.

19 Claims, 15 Drawing Sheets

(56) References Cited

U.S. PATENT DOCUMENTS

| | | | | |
|---|---|---|---|---|
| 3,301,601 | A * | 1/1967 | Zuzelo | E01C 23/0933 299/39.3 |
| 3,357,745 | A * | 12/1967 | Cooper | E01C 23/0933 299/39.3 |
| 3,663,060 | A * | 5/1972 | Shatwell | B28D 1/045 299/39.3 |
| 3,675,689 | A * | 7/1972 | Rice | B27B 17/0091 30/379 |
| 4,840,431 | A * | 6/1989 | Jedick | B27B 9/02 125/14 |
| 6,019,433 | A * | 2/2000 | Allen | B23D 59/002 125/13.01 |
| 6,478,666 | B1 * | 11/2002 | Berger | B24B 19/02 125/13.01 |
| 6,595,840 | B1 * | 7/2003 | Jaensch | B23D 47/02 125/13.01 |
| 7,080,851 | B2 * | 7/2006 | Schipper | B24B 27/08 280/47.2 |
| 7,311,100 | B1 * | 12/2007 | Siewers | B28D 7/02 125/11.22 |
| 7,469,694 | B2 * | 12/2008 | Howard | B27B 9/02 125/13.01 |
| 7,703,211 | B1 * | 4/2010 | Kirchhoff | A01G 3/08 30/296.1 |
| 7,905,223 | B2 * | 3/2011 | von Siegroth | B24B 27/08 125/13.01 |
| 8,186,762 | B2 * | 5/2012 | Aronsson | B28D 1/04 299/39.3 |
| 9,561,574 | B2 * | 2/2017 | Wisenbaker | B25H 1/10 |
| 2004/0006961 | A1 * | 1/2004 | Stahl | A01G 3/0417 56/233 |
| 2006/0240753 | A1 * | 10/2006 | Ziegs | B24B 27/08 451/449 |
| 2017/0232605 | A1 * | 8/2017 | Morton | B23Q 9/0042 173/37 |
| 2020/0231198 | A1 * | 7/2020 | Uriegas | B62B 3/02 |

FOREIGN PATENT DOCUMENTS

| | | |
|---|---|---|
| DE | 102007013705 A1 | 9/2008 |
| EP | 1971752 B2 | 6/2016 |
| EP | 2783563 B1 | 9/2016 |
| GB | 2447760 A | 9/2008 |
| GB | 2447760 B | 11/2009 |
| GB | 2447760 C | 4/2010 |
| KR | 20-0136215 Y1 | 3/1999 |
| KR | 20-0349319 Y1 | 5/2004 |
| KR | 10-0938760 B1 | 1/2010 |
| WO | 2020150312 A1 | 7/2020 |
| WO | 2020150334 A1 | 7/2020 |

OTHER PUBLICATIONS

International Search Report and Written Opinion for PCT Application No. PCT/US2020/013657, dated May 13, 2020, 11 pgs.

* cited by examiner

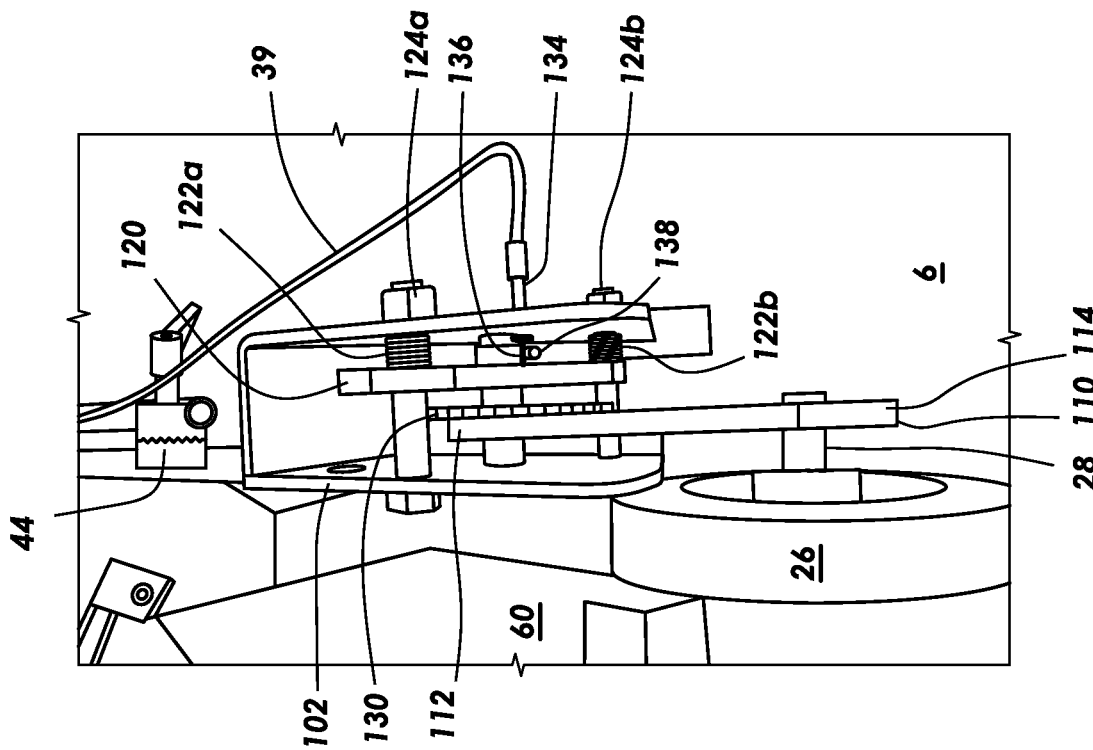
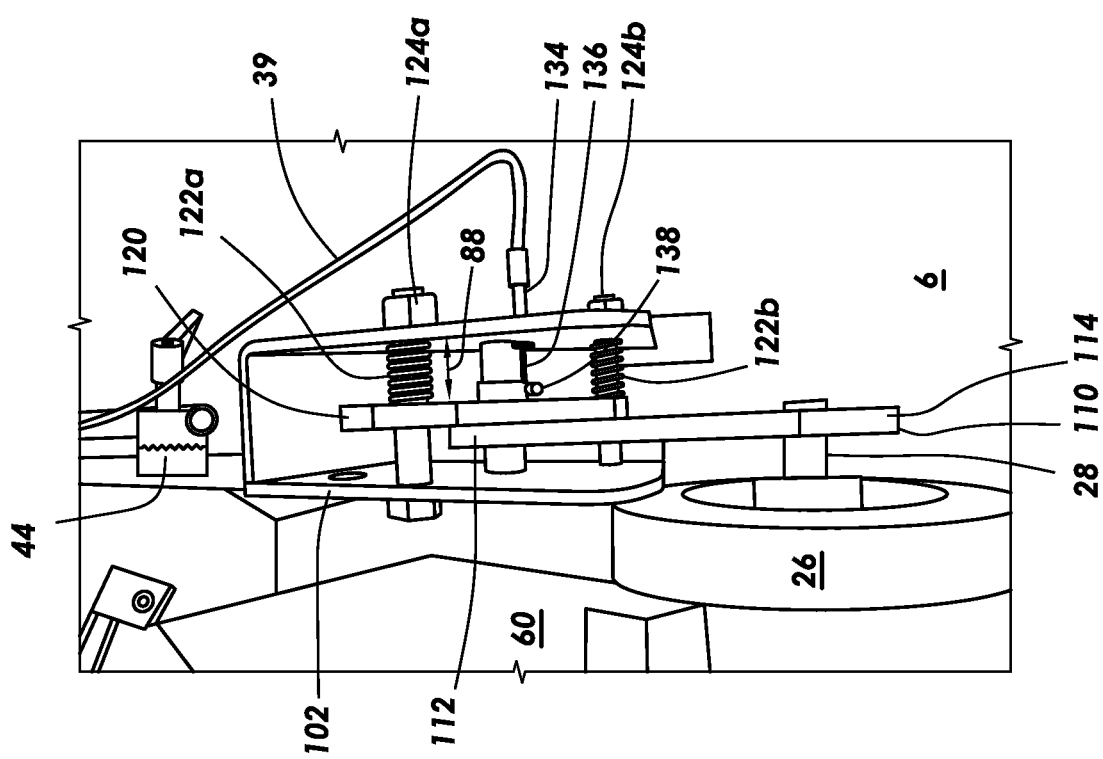

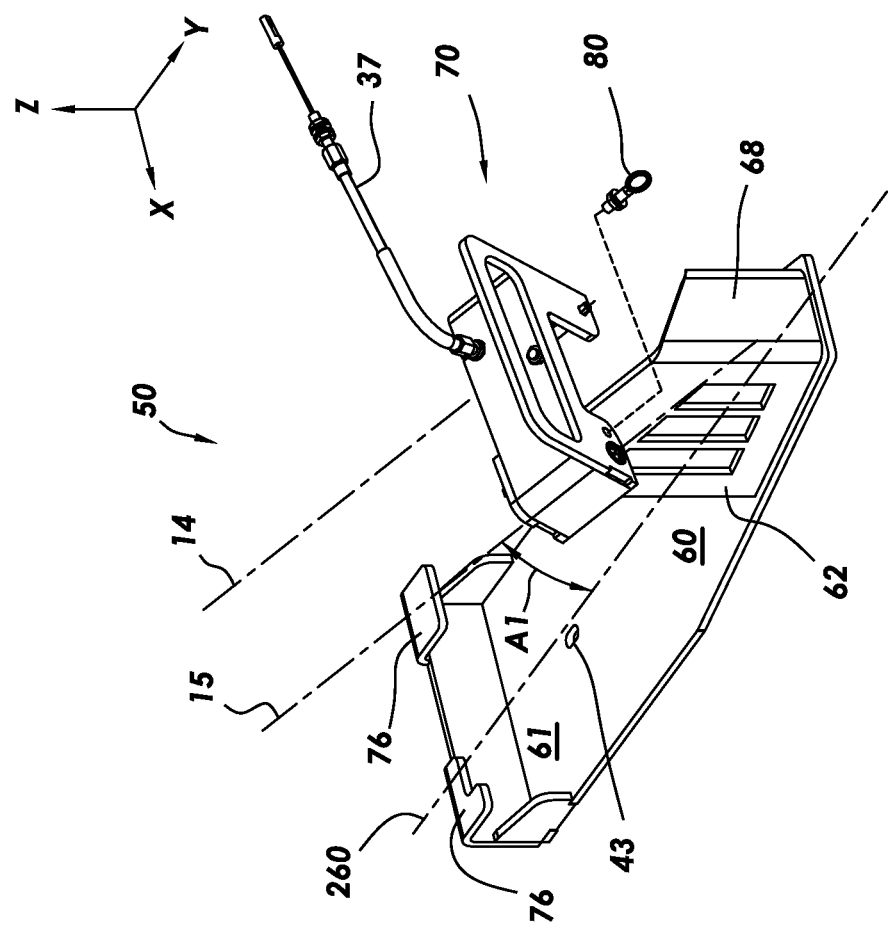
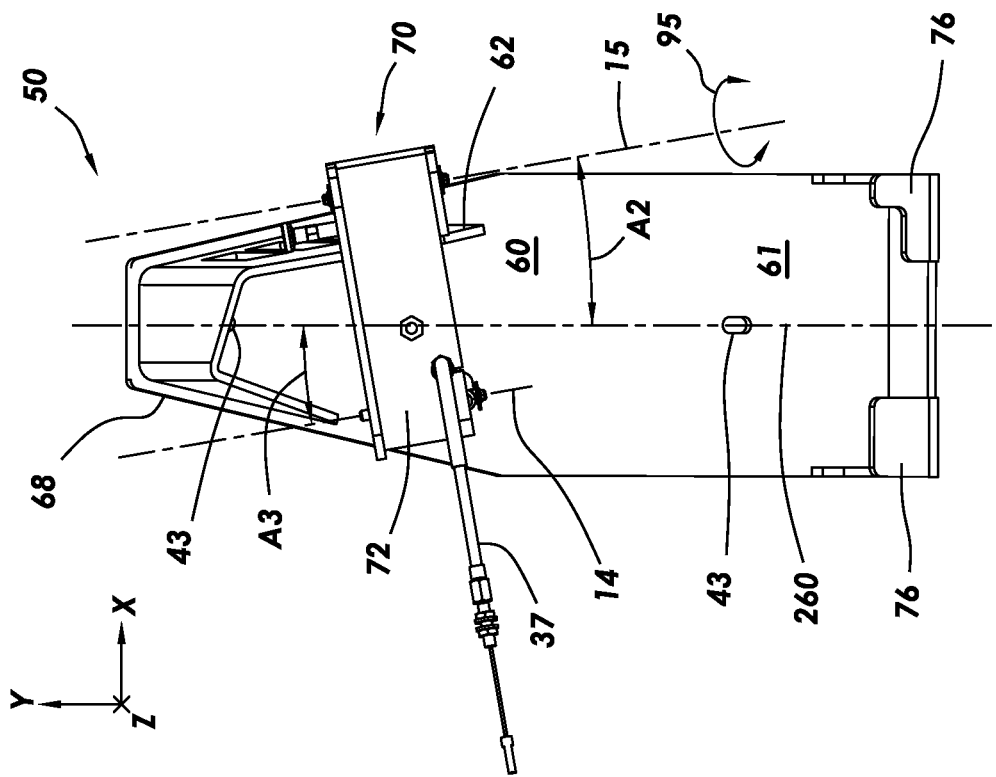

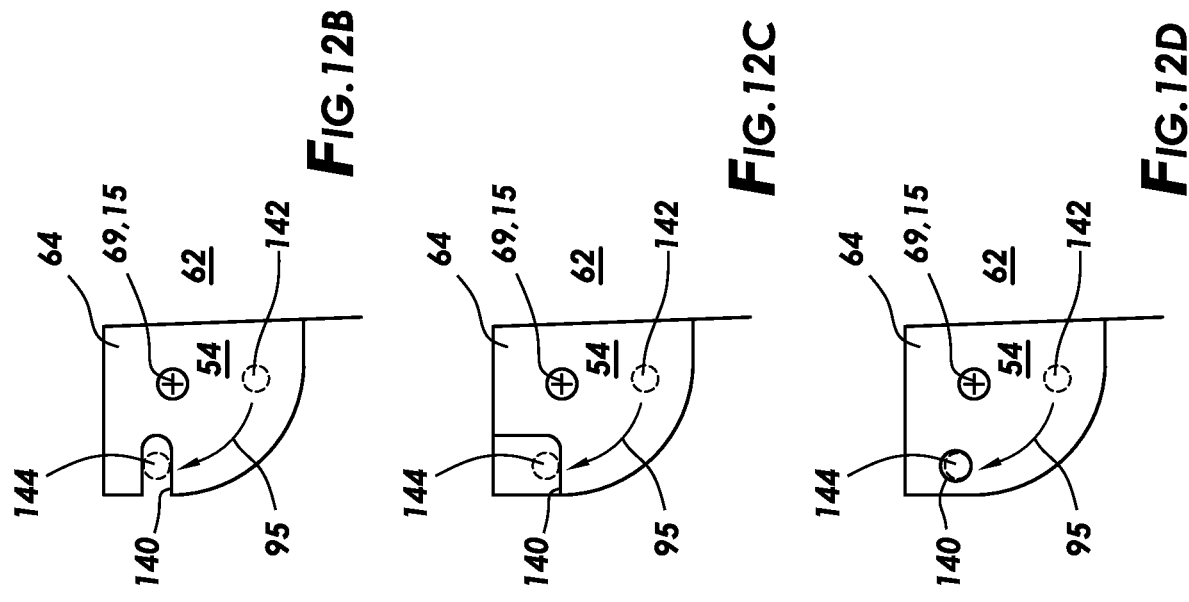
FIG. 12B
FIG. 12C
FIG. 12D
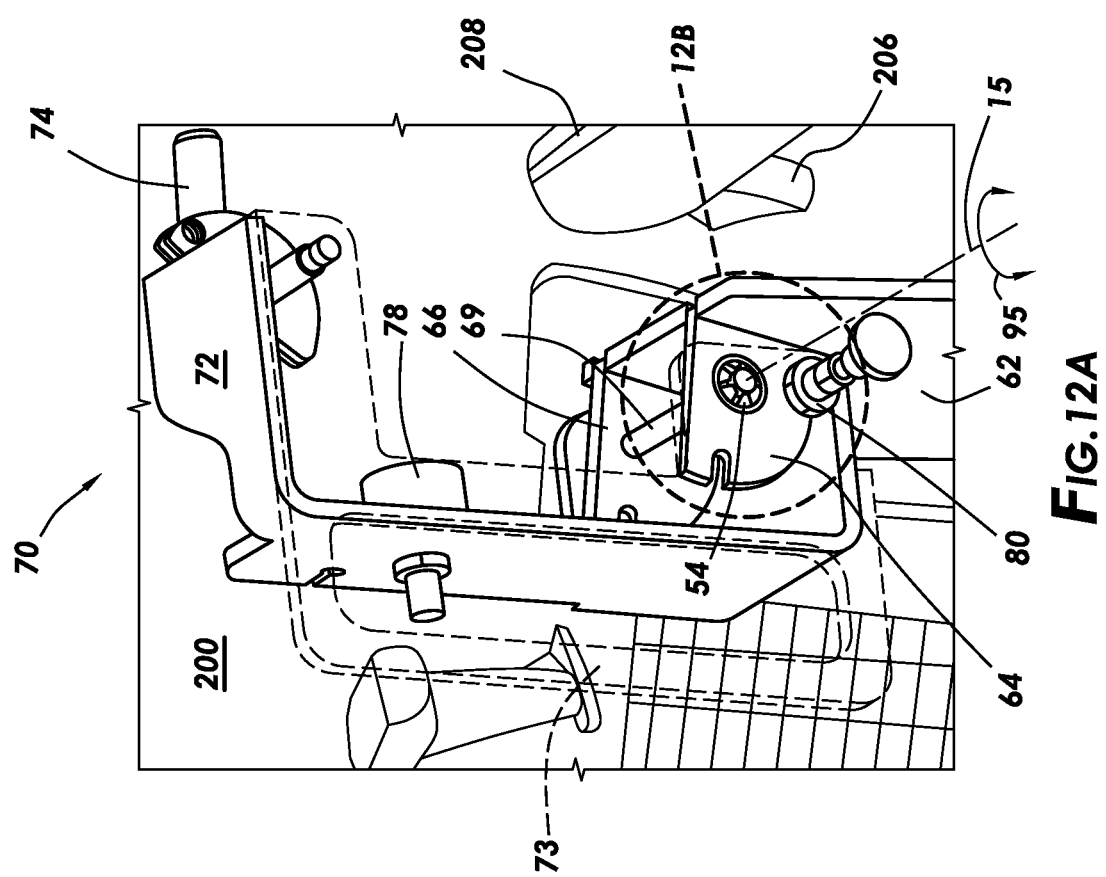
FIG. 12A

US 11,001,287 B2

CART SYSTEM FOR SECURING AND TRANSPORTING A PORTABLE TOOL

CROSS-REFERENCE TO RELATED APPLICATION(S)

This application claims priority under 35 U.S.C. § 119(e) to U.S. Patent Application No. 62/793,566, entitled "CART SYSTEM FOR SECURING AND TRANSPORTING A PORTABLE TOOL," by Selim ARITURK et al., filed Jan. 17, 2019, which application is assigned to the current assignee hereof and incorporated herein by reference in its entirety.

TECHNICAL FIELD

The present disclosure generally relates to carts for tools and, in particular, carts for high-speed portable power tools, such as high-speed portable saws.

BACKGROUND

The portable tools, such as high-speed portable saws, can be hand held by an operator to cut material, such as wood, tile, masonry, concrete, metal, etc. The operator may normally grab a front handle of the tool with one hand and a rear handle of the tool with the other hand to manually manipulate the tool (gasoline, electric, pneumatic, hydraulic, or battery powered) to cut the material. However, it can be difficult for an operator to cut a material at a constant depth while holding a portable tool by hand. It will be readily appreciated that improvements in the arts of carts for portable tools are continually needed.

SUMMARY

This disclosure is drawn to mounting a portable tool to a wheeled cart and transporting the portable tool along a surface of a material to be cut. The portable tool can be secured to the wheeled cart for transporting along the surface and adjusting a height of the cart from the surface. This allows the portable tools to be used both for hand-held operations and for walk-behind operations.

One general aspect is a system that can include a cart, a mounting bracket configured to be removably attached to the cart and configured to receive a portable tool, the mounting bracket including one or more retainers configured to engage a front portion of the portable tool; and a clamp assembly rotationally attached to the mounting bracket, the clamp assembly configured to engage a rear portion of the portable tool when the clamp assembly is in a locked position, such that further rotation of the clamp assembly is prevented and the portable tool is secured to the mounting bracket.

One general aspect is a system that can include an adjustable arm with a first end and a second end, with the first end opposite the second end, the first end being rotationally attached to the body of the cart at a forward position such that the adjustable arm rotates about an axis at the forward position, and a front wheel being rotationally attached to the second end; a circular disk fixedly attached to the first end of the adjustable arm such that the circular disk rotates with the adjustable arm about a first axis, the circular disk having a first pattern formed around a perimeter of the circular disk; and a plate moveably attached to the body, the plate having a recess formed in a surface of the plate, the recess having a second pattern that mates with the first pattern, with rotation of the adjustable arm about the first axis being prevented when the circular disk having the first pattern is engaged in the recess having the second pattern, and rotation of the adjustable arm about the first axis being permitted when the circular disk is disengaged from the recess.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which:

FIGS. 7A-7B are representative front views of a cart for a portable tool showing operation of the height adjustment mechanism of FIG. 6B, according to one or more example embodiments;

FIG. 10A is a representative top view of a mounting assembly of the cart system, according to one or more example embodiments;

FIG. 10B is a representative perspective view of the mounting assembly of FIG. 10A, according to one or more example embodiments;

FIG. 12A is a representative perspective partial translucent view of the clamping device of FIG. 11 in a disengaged position, according to one or more example embodiments;

FIGS. 12B-12D are representative front views of various retention features of the clamping device with reference to the detail 12B indicated in FIG. 12A, according to one or more example embodiments.

DETAILED DESCRIPTION OF THE DISCLOSURE

Generally, this disclosure provides a system and method for securely attaching a mounting assembly to a cart and mounting a portable tool to the mounting assembly. It should be understood that the portable tool can also be mounted to the mounting assembly before being attached to the cart. This cart system can allow a portable tool to be used as a walk-behind tool for cutting along a surface at a controlled depth.

Figure 1:
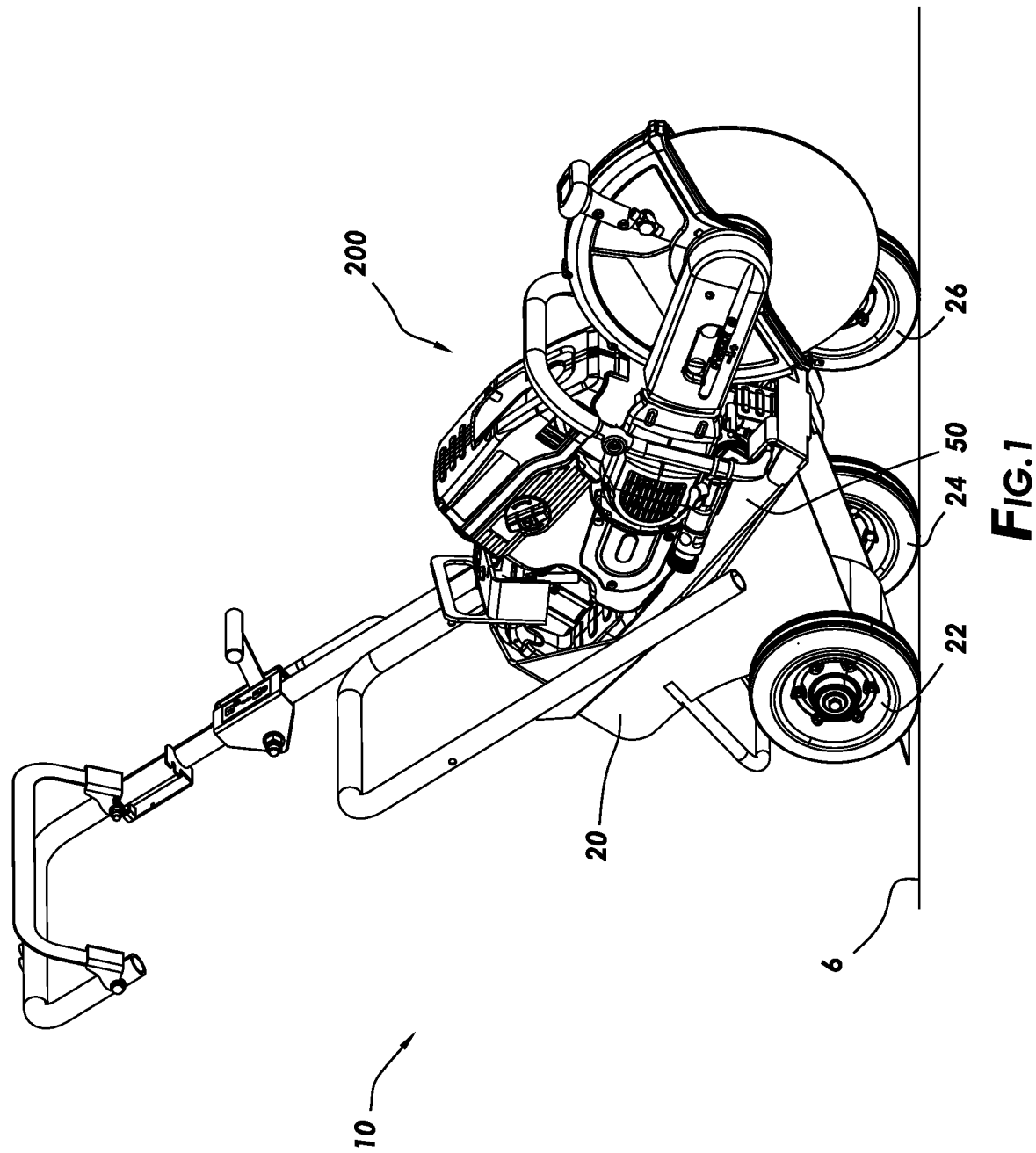
FIG. 1 is a representative perspective view of a cart system with a portable tool mounted to a cart, according to one or more example embodiments.

FIG. 1 is a representative perspective view of a cart system 10 with a portable tool 200 mounted to a cart 20, according to one or more example embodiments. The cart 20 can have multiple wheels 22, 24, 26 rotationally attached to the cart 20. The portable tool 200 is mounted to a mounting assembly 50 which is removably attachable to the cart 20. In a preferred embodiment, the cart has two rear wheels 22, 24 and one front wheel 26. However, it should be understood that more or fewer wheels can be used. For example, dual wheels can be rotationally attached to any one or more of the wheel positions for wheels 22, 24, 26. The wheels 22, 24, 26 allow an operator to maneuver the cart across the surface 6. If a portable tool 200 with a saw blade is attached, the user can cut a groove in the surface 6 at a desired depth as the operator maneuvers the cart 20.

Figure 2:
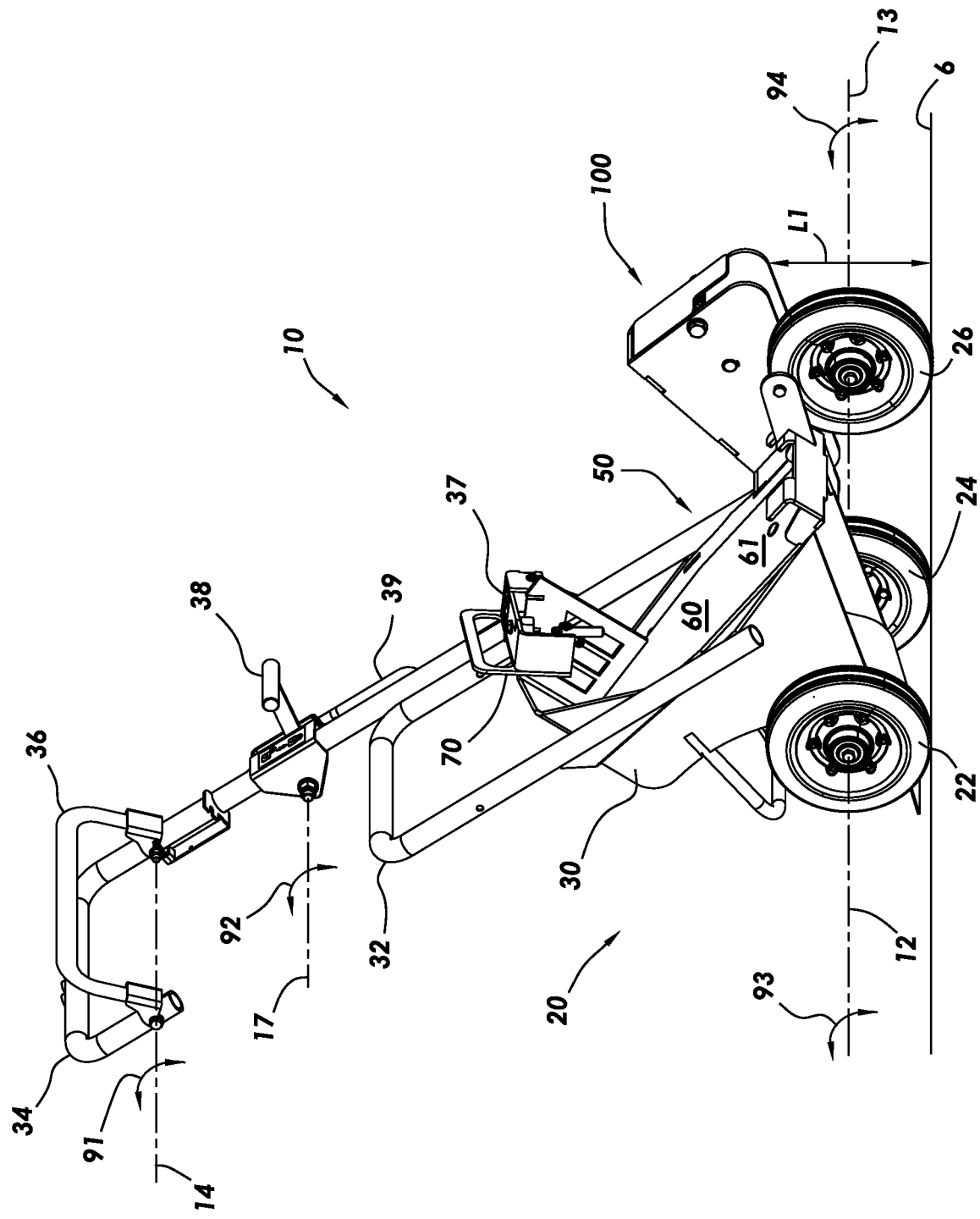
FIG. 2 is a representative perspective view of a cart system with a mounting assembly for mounting a portable tool to a cart, according to one or more example embodiments.

FIG. 2 is a representative perspective view of a cart system 10 that can be used to mount a portable tool 200 to a cart, according to one or more example embodiments. The cart system 10 can include a cart 20, a mounting assembly 50, an operator handle 34, remote manual controls 36, 38 mounted to the operator handle 34, and a height adjustment mechanism 100. The cart 20 can include a body 30, a support structure 32, wheels 22, 24, 26, and the height adjustment mechanism 100. The rear wheels 22, 24 are rotationally attached to the body 30 and configured to rotate 93 about the axis 12. In some embodiments, an axle (not shown) can be rotationally attached to the body 30 with the rear wheel 22 rotationally fixed to one end of the axle and the rear wheel 24 rotationally fixed to an opposite end of the axle, thereby positioning the rear wheels 22, 24 at left and right sides of the cart and positioning the wheels 22, 24 at a rear of the body 30. Alternatively, each rear wheel 22, 24 can be attached separately to the body 30 via individual rods attached to the body, with each wheel 22, 24 being rotationally mounted to a respective one of the individual rods. The rods can be fixedly attached to the body 30, such as by welding, or removably attached via threaded ends of the rods, or attached by other means that secures the rods to the body such that the rods are rotationally fixed with the body.

Alternatively, the rods can be rotationally fixed or rotationally attached to respective ones of the wheels 22, 24 with the rods rotationally attached to the body, allowing rotation of the wheel and the rod relative to the body 30. The front wheel 26 can be rotationally attached to an adjustable arm in the height adjustment mechanism 100, with the front wheel configured to rotate 94 about the axis 13. As the front wheel 26 is manipulated by the height adjustment mechanism 100, the distance L1 of the cart body from the surface 6 can be changed to raise and lower the cart body 30 relative to the surface 6. A control 38, mounted on the operator handle 34, can be mechanically coupled to the height adjustment mechanism 100 via a cable assembly 39. The control 38 can be manipulated (e.g. rotated 92 about axis 17) by an operator to either allow a height adjustment (e.g. allow changes to distance L1) or prevent the height adjustment (e.g. prevent changes to distance L1).

The mounting assembly 50 can be removably attached to the cart body 30. The mounting assembly 50 can include a clamping assembly 70 and a mounting bracket 60 with a base plate 61. The mounting bracket 60 can include a base plate 61 with various structures connected to the base plate 61 to support a portable tool 200 when installed on the cart system 10. The clamping assembly 70 can be rotationally attached to the mounting bracket 60 via a support structure and used to clamp the portable tool 200 to the mounting assembly 50, thus securing the portable tool 200 to the cart 20. A control 36, mounted on the operator handle 34, can be mechanically coupled to the clamping assembly 70 via a cable assembly 37. The control 36 can be manipulated (e.g. rotated 91 about axis 14) by an operator to remotely operate a trigger on the portable tool 200.

Figure 3:
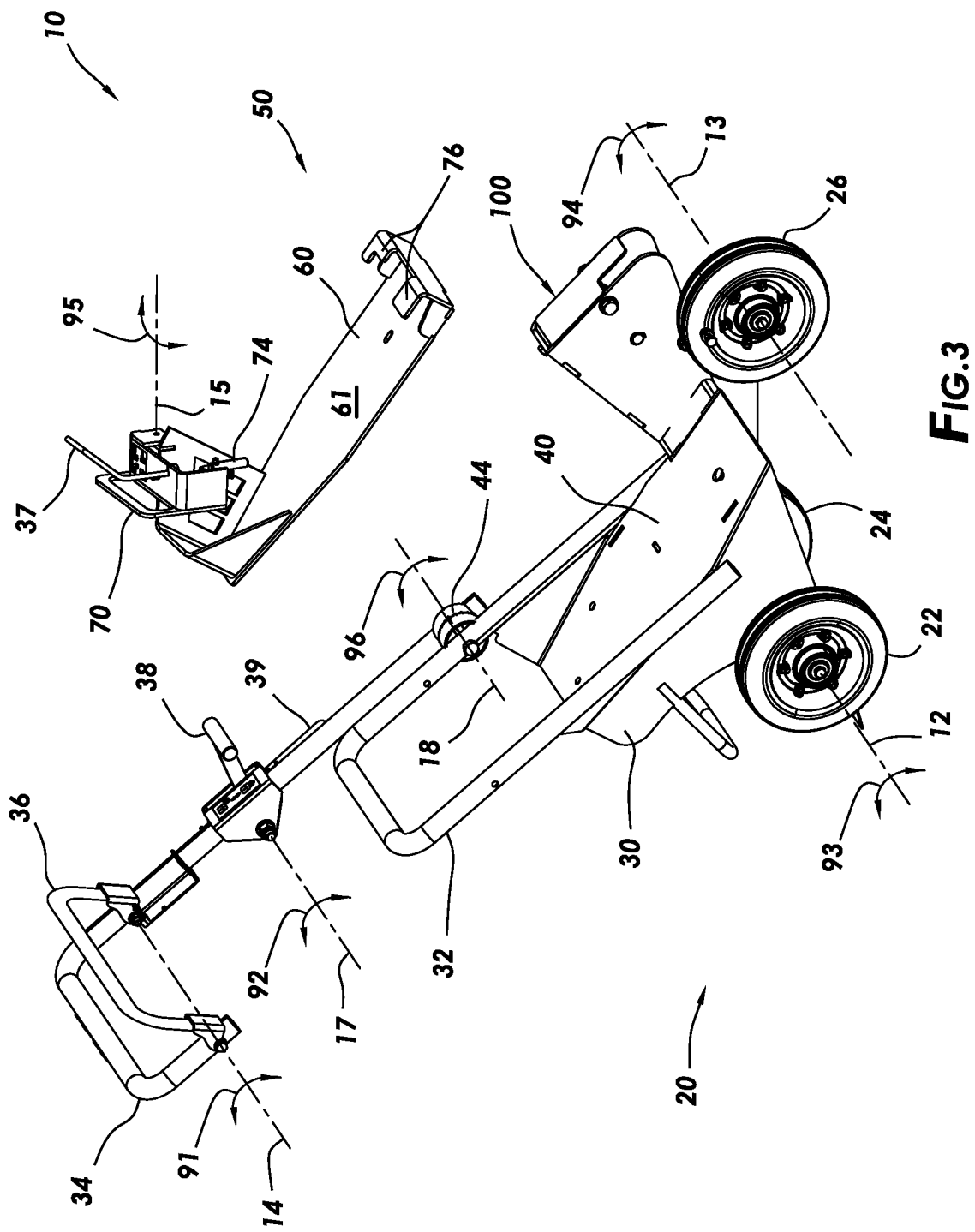
FIG. 3 is a representative perspective exploded view of a cart system with a cart and a mounting assembly for mounting a portable tool to the cart, according to one or more example embodiments.

FIG. 3 is a representative perspective exploded view of a cart system 10 with a cart 20 and a mounting assembly 50 for mounting a portable tool to the cart 20, according to one or more example embodiments. The mounting assembly 50 can be removably attached to the cart 20 by bolting the base plate 61 of the mounting bracket 60 to the surface 40 of the cart 20 via holes in each of the base plate 61 and the surface 40. An adjustable handle 34 can be attached to the cart 20 at the attachment point 44. The attachment point 44 can allow the handle 34 to be rotated 96 about the axis 18 when a fastener at the attachment point 44 is loosened, and rotation 96 about the axis 18 can be prevented when the fastener at the attachment point 44 is tightened. This allows for adjusting the handle 34 to different heights to accommodate different operators.

Figure 4:
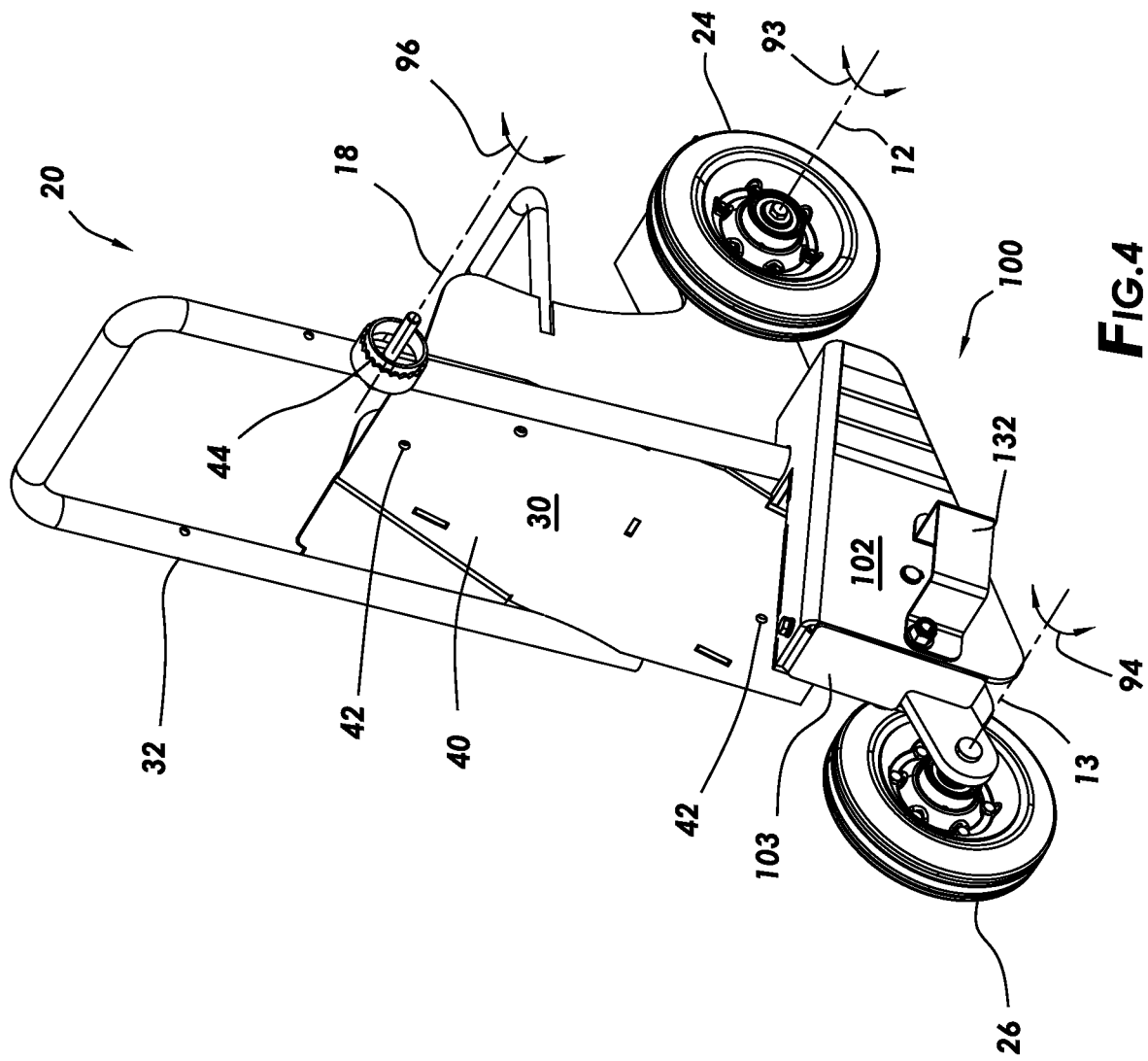
FIG. 4 is a representative perspective view of a cart for a portable tool, according to one or more example embodiments.

FIG. 4 is a representative right side perspective view of a cart for a portable tool, according to one or more example embodiments. The cart 20 is shown without a handle 34 and without a mounting assembly 50. Connection points 42 can be configured to receive fasteners for attaching a mounting assembly 50 to the surface 40. The cart 20 includes the height adjustment mechanism 100 for adjusting a height L1 of the cart 20 relative to the surface 6 (see FIG. 5). A guard 132 can be attached to a portion of the height adjustment mechanism 100 to protect control cables that may be attached to the height adjustment mechanism 100. In this example embodiment, the height adjustment mechanism 100 is contained within a generally inverted U-shaped cover 102 that is inclined from the rear toward the front with the largest portion of the cover 102 at the front of the cover 102. The cover 102 is fixedly attached to the body and provides structural support for components of the height adjustment mechanism 100. A plate 103 can be removably attached to the cover 102 to shield the height adjustment mechanism 100 from debris and provide a more esthetically pleasing appearance. The plate 103 can also provide a gauge that limits the body 30 from being lowered past a desired point. The plate 103 can thereby limit a depth of cut of a portable saw (i.e. an example of a portable tool 200). The height adjustment mechanism 100 will be described in more detail below.

Figure 5:
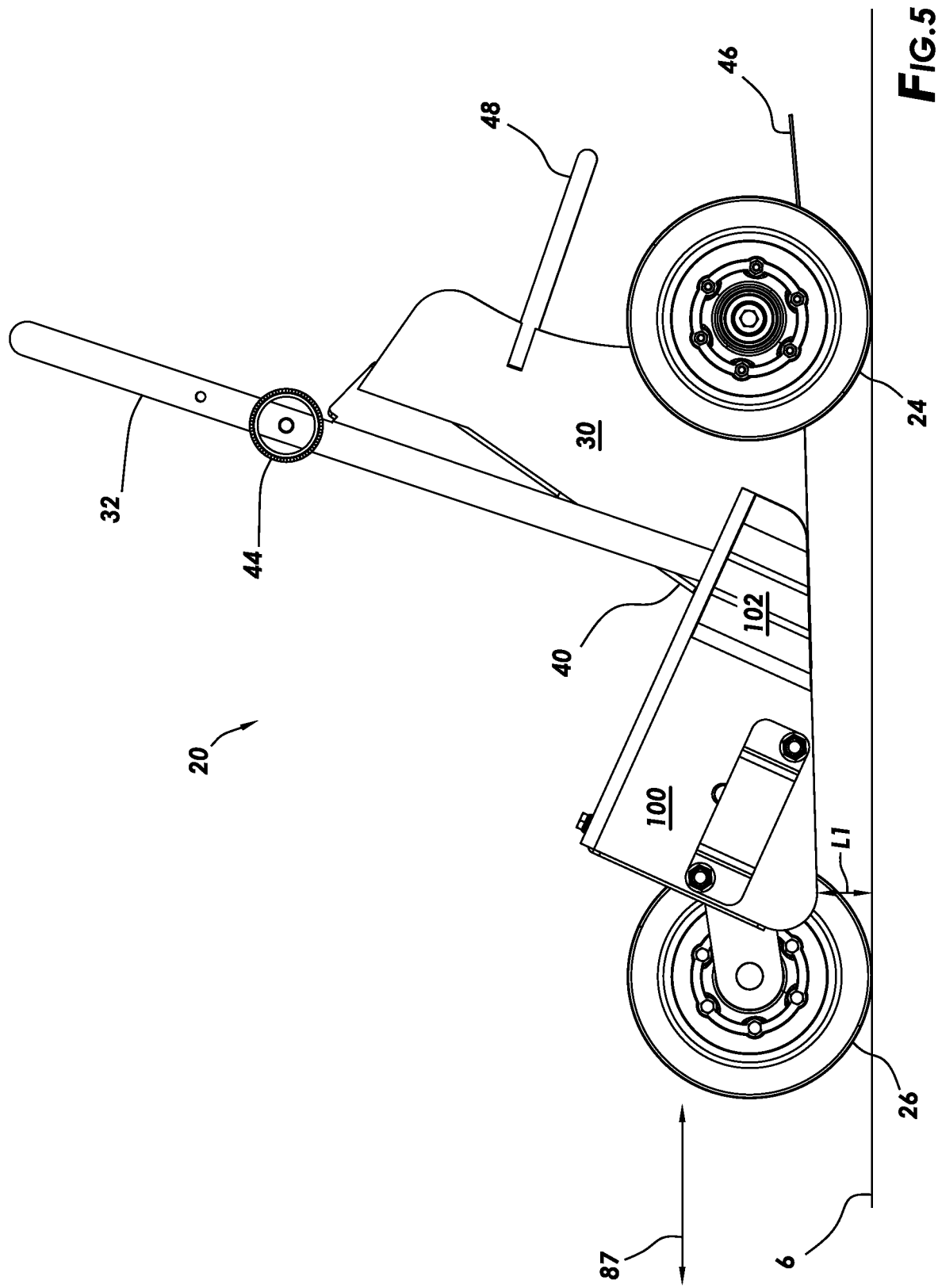
FIG. 5 is a representative side view of a cart for a portable tool, according to one or more example embodiments.

FIG. 5 is a representative side view of the cart 20 of FIG. 4 for a portable tool 200, according to one or more example embodiments. The front wheel 26 is attached to an arm of the height adjustment mechanism 100 that extends from the body 30. The arm is rotationally attached to the body 30. Rotation of the arm can vary the height L1 of the cart 20 from the surface 6. The cart may include a rear shelf 46 which can be used by an operator to carry items on the cart 20. A holder 48 can be used to loosely secure the items on the shelf 46. An operator can propel the cart 20 forward or backward across the surface as indicated by the arrows 87 (i.e. direction of travel). The operator can also use the handle 34 (not shown) to reorient the cart to travel in any direction across the surface 6.

Figure 6A:
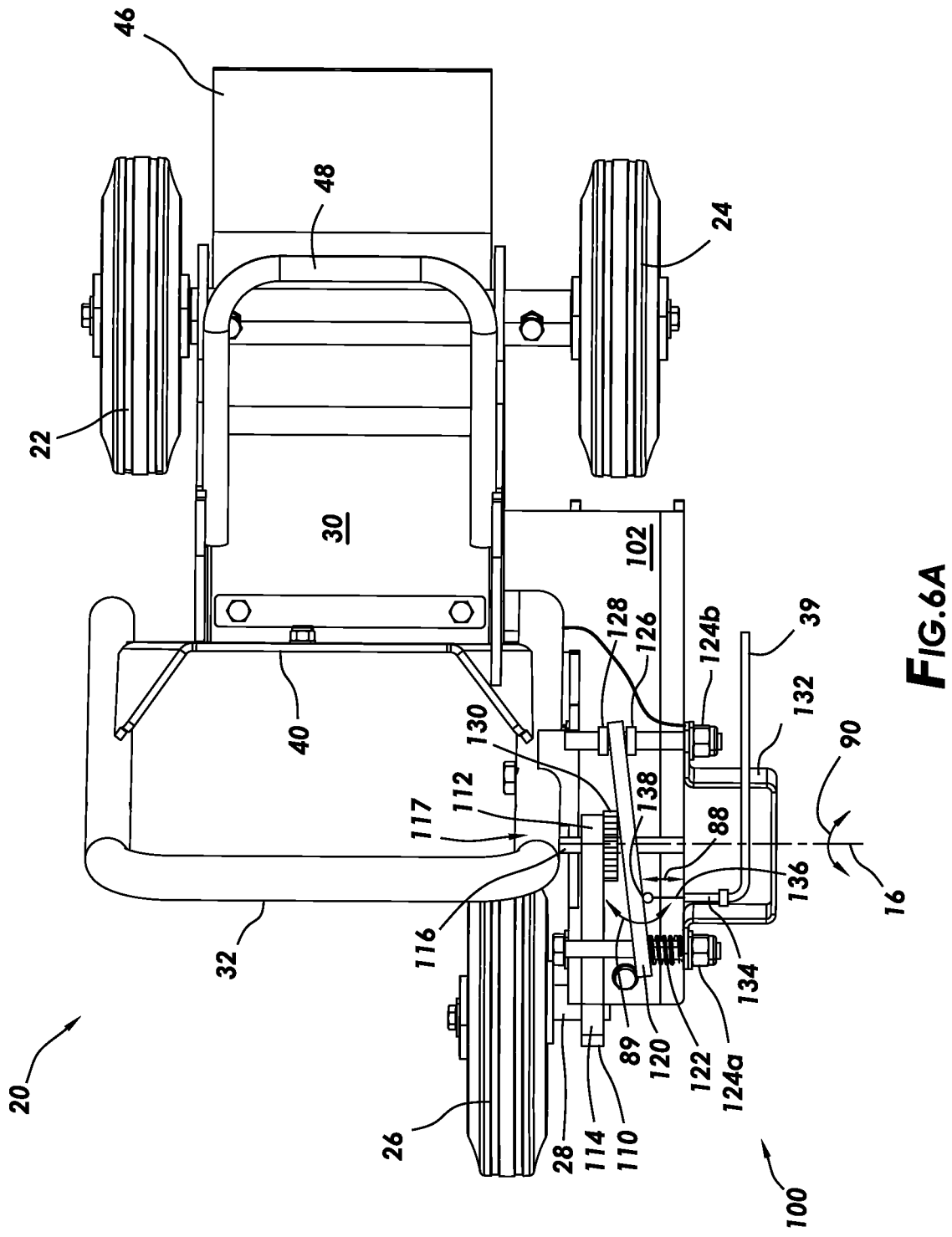
FIGS. 6A-6B are representative partial cross-sectional top views of a cart for a portable tool, each cart having a height adjustment mechanism, according to one or more example embodiments.

FIG. 6A is a representative partial cross-sectional top view of a cart 20 for a portable tool 200, the cart 20 having a height adjustment mechanism 100, according to one or more example embodiments. FIG. 6A is from a perspective of the cart of FIG. 5 as indicated by the arrow in FIG. 5. The height adjustment mechanism 100 can include an adjustable arm 110 and a moveable plate 120 positioned within the inverted U-shaped cover 102. The U-shaped cover 102 is partially cut-away to reveal components of the height adjustment mechanism 100. The adjustable arm 110 can have a front axle 28 mounted at a front end 114 of the adjustable arm 110 with a rod 116 attached at an opposite rear end 112 of the adjustable arm 110. The front axle 28 and the rod 116 can be fixedly mounted at right angles to the body of the adjustable arm 110. The front wheel 26 can be rotationally mounted to the front axle 28. The rod 116 can be rotationally mounted to a forward position 117 of the cart 20 (e.g. a position within the U-shaped cover 102). The rod 116 extends from both sides of the arm 110 to be rotationally supported by both sides of the U-shaped cover 102, such that the adjustable arm 110 rotates 90 about the axis 16. A circular disk 130 is mounted to the adjustable arm 110 such that it rotates with the arm 110.

A pair of rods 124a, 124b can span across the U-shaped cover 102 and be positioned on opposite sides of the rod 116, with a moveable plate 120 slidably mounted to the rods. One side of the moveable plate 120 may be constrained by keepers 126, 128 to minimize movement of that side along the rod 124b. Another side of the moveable plate 120 may be allowed to slide along the rod 124a. When a cable 136 in a cable assembly 39 is pulled (arrows 88), the moveable plate 120 can rotate away from the adjustable arm 110 and store energy in a biasing device 122 (i.e. compress or elongate the biasing device). It should be understood that one side of the moveable plate 120 can be configured more like a hinge instead of using the keepers 126, 128 on the rod 124b.

The circular disk 130 can have a plurality of teeth around it's perimeter that form a pattern (e.g. a gear sprocket). The moveable plate 120 has a recess formed in a surface that faces the circular disk 130. The recess has a complimentarily shaped pattern that receives the circular disk 130. When the circular disk 130 is engaged in the recess, the adjustable arm 110 is not permitted to rotate about the axis 16 (arrows 90). This locks the front wheel 26 in position and sets the height L1 of the cart relative to the surface 6. When the circular disk 130 is disengaged from the recess, then the adjustable arm is permitted to rotate about the axis 16. This allows the position the front wheel 26 to be adjusted, thereby allowing the height L1 of the cart relative to the surface 6 to be adjusted.

Therefore, an operator may pull the cable 136 in the cable assembly 39 and rotate the moveable plate 120 (arrows 89), which can, in this configuration, compress the biasing device 122 and disengage the circular disk 130 from the recess in the moveable plate 120. The height L1 can then be adjusted by rotating the adjustable arm 110 about the axis 16. The operator may release the cable 136 allowing the biasing device 122 to urge the moveable plate 120 back toward the circular disk 130, thereby engaging the circular disk 130 with the recess and preventing further rotation of the adjustable arm 110 about the axis 16. The cable assembly 39 can be used by an operator to remotely control the rotation of the moveable plate 120. The cable assembly 39 can have a cable 136 slidably positioned within an outer jacket. A fitting 134 can be attached to the cover 102 securing an end of the outer jacket to the cover 102 while allowing the cable 136 to slide relative to the outer jacket. An end of the cable 136 can be connected to a feature 138 on the moveable plate 120, such that pulling on the cable 136 rotates 89 the plate 120 in one direction. When the cable 136 is released, the biasing device 122 rotates 89 the plate 120 in an opposite direction. The guard 132 can provide protection to the cable assembly 39 and the fitting 134 that is mounted to the cover 102.

Figure 6B:
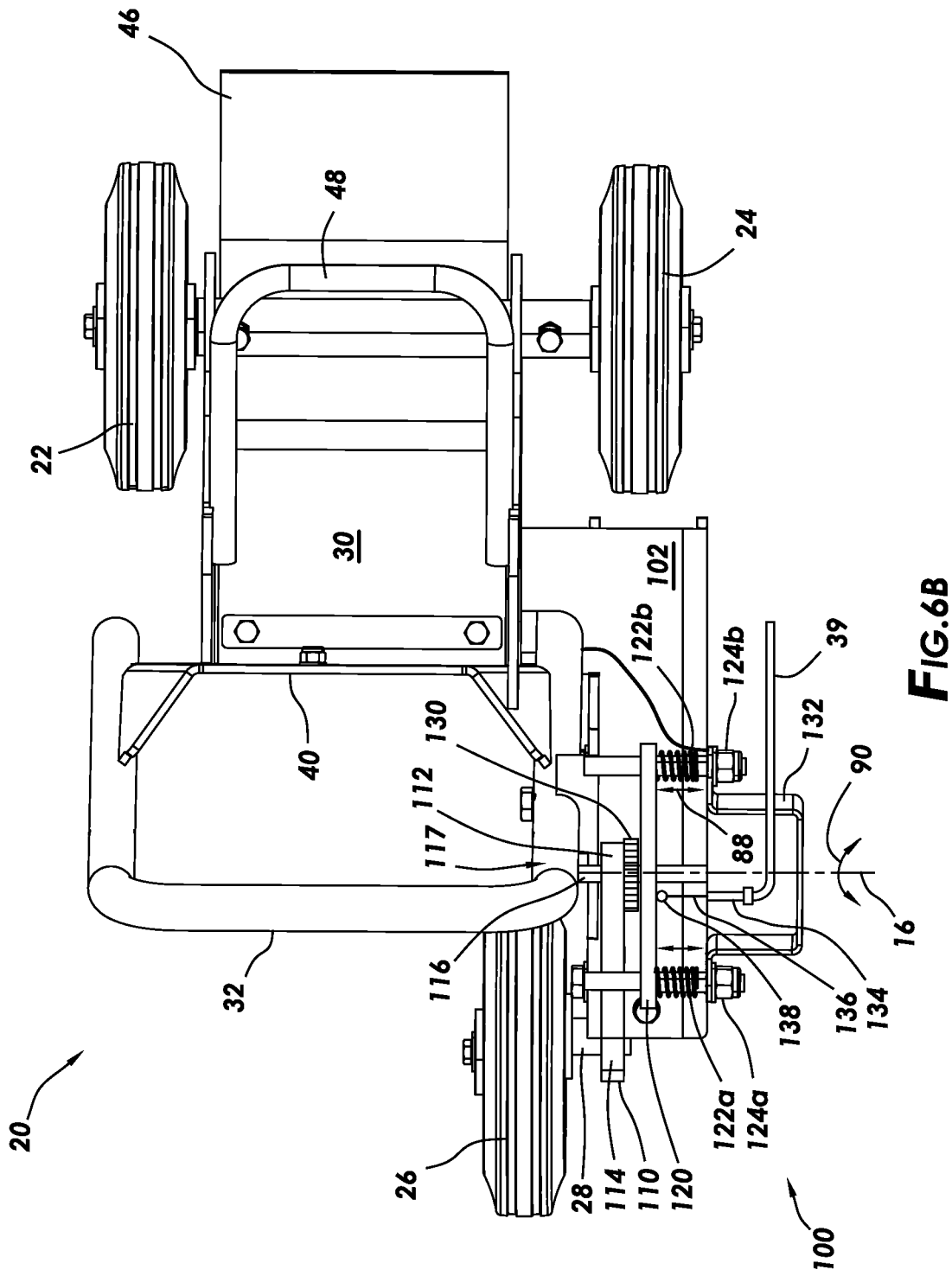

FIG. 6B is a representative partial cross-sectional top view of a cart for a portable tool, the cart having a height adjustment mechanism 100, according to one or more example embodiments. FIG. 6B is from a perspective of the cart as indicated by the arrow in FIG. 5. The height adjustment mechanism 100 can include an adjustable arm 110 and a moveable plate 120 positioned within the inverted U-shaped cover 102. The U-shaped cover 102 is partially cut-away to reveal components of the height adjustment mechanism 100. The adjustable arm 110 can have a front axle 28 mounted at a front end 114 of the adjustable arm 110 with a rod 116 attached at opposite rear end 112 of the adjustable arm 110. The front axle 28 and the rod 116 are fixedly mounted at right angles to a body of the adjustable arm 110. The front wheel 26 can be rotationally mounted to the front axle 28. The rod 116 can be rotationally mounted to a forward position 117 of the cart 20 (e.g. a position within the U-shaped cover 102). The rod 116 extends from both sides of the arm 110 to be rotationally supported by both sides of the U-shaped cover 102, such that the adjustable arm 110 rotates 90 about the axis 16. A circular disk 130 is mounted to the adjustable arm 110 such that it rotates with the arm 110.

A pair of rods 124a, 124b can span across the U-shaped cover 102 and be positioned on opposite sides of the rod 116, with a moveable plate 120 slidably mounted to the rods. When a cable 136 in a cable assembly 39 is pulled (arrows 88), the moveable plate 120 can move laterally away from the adjustable arm 110 and store energy in the biasing devices 122a, 122b (i.e. compress or elongate the biasing device). The circular disk 130 can have a plurality of teeth around it's perimeter that form a pattern (e.g. a gear sprocket). The moveable plate 120 has a recess formed in a surface that faces the circular disk 130. The recess has a complimentarily shaped pattern that receives the circular disk 130. When the circular disk 130 is engaged in the recess, the adjustable arm 110 is not permitted to rotate about the axis 16 (arrows 90). This locks the front wheel 26 in position and sets the height L1 of the cart relative to the surface 6. When the circular disk 130 is disengaged from the recess, then the adjustable arm is permitted to rotate about the axis 16. This allows the position the front wheel 26 to be adjusted, thereby allowing the height L1 of the cart relative to the surface 6 to be adjusted.

Therefore, an operator may pull the cable 136 in the cable assembly 39 and laterally move the plate 120 (arrows 88), which can compress (in this configuration) the biasing devices 122a, 122b and disengage the circular disk 130 from the recess in the moveable plate 120. The height L1 can then be adjusted by rotating the adjustable arm 110 about the axis 16. The operator may release the cable 136 allowing the biasing devices 122a, 122b to urge the moveable plate 120 back toward the circular disk 130, thereby engaging the circular disk 130 with the recess and preventing further rotation of the adjustable arm 110 about the axis 16. The cable assembly 39 can be used by an operator to remotely control the lateral position of the moveable plate 120. The cable assembly 39 can have a cable 136 slidably positioned within an outer jacket. A fitting 134 can be attached to the cover 102 securing an end of the outer jacket to the cover 102 while allowing the cable 136 to slide within the outer jacket. An end of the cable 136 can be connected to a feature 138 on the moveable plate 120, such that pulling on the cable 136 laterally moves (arrows 88) the plate 120 in one direction. When the cable 136 is released, the biasing devices 122a, 122b can laterally move (arrows 88) the plate 120 in an opposite direction. The guard 132 can provide protection to the cable assembly 39 and the fitting 134 that is mounted to the cover 102.

FIG. 7A is a front view of the height adjustment mechanism 100 in the U-shaped cover 102 without the plate 103 being installed for clarity. As can be seen, the moveable plate 120 has been moved into engagement with the circular disk 130, with the biasing devices 122a, 122b extended, and the cable 136 released. Since the moveable plate 120 is engaged with the adjustable arm 110, the front wheel is locked in position. However, FIG. 7B shows the cable 136 pulled, which caused the moveable plate to move laterally away from adjustable arm 110 and disengage the circular disk 130. Notice that the biasing devices 122a, 122b are compressed to store energy. If the biasing devices 122a, 122b were mounted on the respective rods 124a, 124b and attached to the moveable plate 120 and the body 30, the biasing devices 122a, 122b could be elongated to store energy. When the position of the front wheel 26 is adjusted to a desired position, the cable can again be released causing the biasing devices 122a, 122b to urge the moveable plate 120 back into engagement with the circular disk 130 and locking the front wheel in its position, thus returning to the configuration shown in FIG. 7A.

Figure 8A:
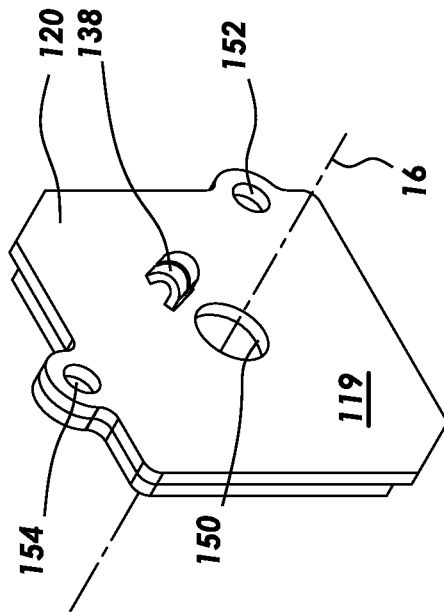
FIG. 8A is a representative perspective view of an adjustable arm of the adjustable height mechanisms, such as in FIGS. 6A-6B, according to one or more example embodiments.

FIG. 8A is a representative perspective view of an adjustable arm 110 of the adjustable height mechanism 100, such as the ones shown in FIGS. 6A-6B, according to one or more example embodiments. The front axle 28 is fixed at a front end 114 of the adjustable arm 110, with the circular disk 130 and the rod 116 fixed at opposite rear end 112. The circular disk 130 can have a plurality of teeth 104 which form a pattern 106 around a perimeter of the circular disk 130.

Figure 8B:
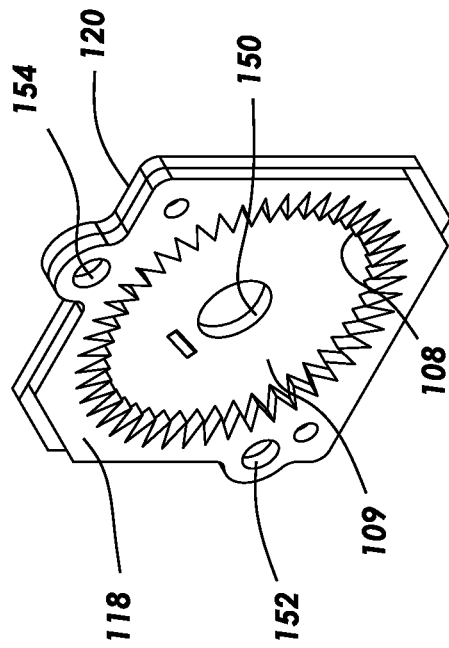
FIGS. 8B-8C are representative perspective views of a moveable plate of the adjustable height mechanism, such as in FIGS. 6A-6B, according to one or more example embodiments.
Figure 8C:
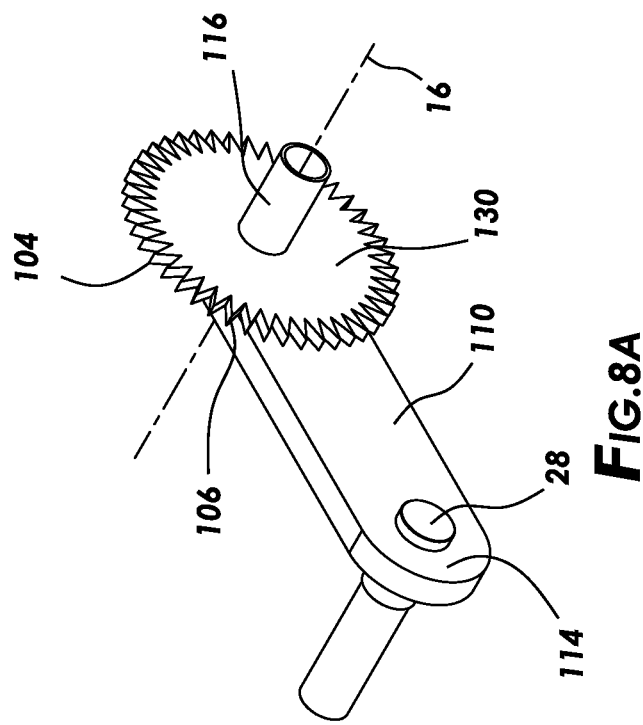

FIGS. 8B-8C are front and back perspective views of the moveable plate 120 of the adjustable height mechanism 100, such as the ones shown in FIGS. 6A-6B, according to one or more example embodiments. In the adjustable height mechanism 100, the moveable plate 120 receives the rod 124a through a hole 154, the rod 124b through a hole 152, and the rod 116 through the hole 150. These holes 150, 152, 154 can provide adequate clearance to allow the moveable plate 120 to slide along the rods 124a, 124b and the rod 116.

A feature 138 with a central slot can be fixedly attached to a surface 119 of the moveable plate 120. The feature 138 can receive an end of the cable 136 and can apply a pulling force of the cable 136 to the moveable plate 120. A recess 109 can be formed in a surface 118 of the moveable plate 120. The perimeter of the recess 109 can form a pattern 108, which is a complimentary shape relative to the shape 106 of the circular disk 130. It can be seen, that with rods 124a, 124b inserted through respective holes 154, 152, the moveable plate is prevented from rotating about the rod 116 when the rod 116 is inserted through the hole 150. When the pattern 106 of the adjustable arm 110 is inserted into the pattern 108 of the recess 109, the patterns engage each other and prevent rotation of the adjustable arm 110 about the center axis 16 of the rod 116.

It should be understood that the patterns 106, 108 shown in FIGS. 8A, 8C are not required to have triangle shaped teeth as shown in FIGS. 8A, 8C. The patterns 106, 108 can be variously shaped patterns as long as the patterns 106 and 108 are complimentary shapes. The patterns 106, 108 can have any number of teeth as well. A fewer number of teeth than shown in FIGS. 8A, 8C can result in larger incremental steps in height adjustment for the cart 20. A larger number of teeth than shown in FIGS. 8A, 8C can result in smaller incremental steps in height adjustment for the cart 20.

Figure 9A:
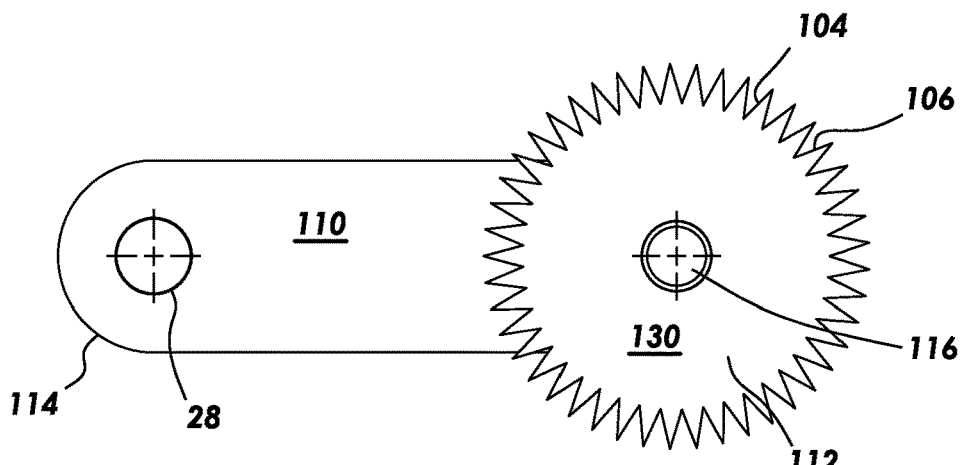
FIGS. 9A-9C are representative side views of an adjustable arm of the adjustable height mechanism, such as in FIGS. 6A-6B, according to one or more example embodiments.
Figure 9B:
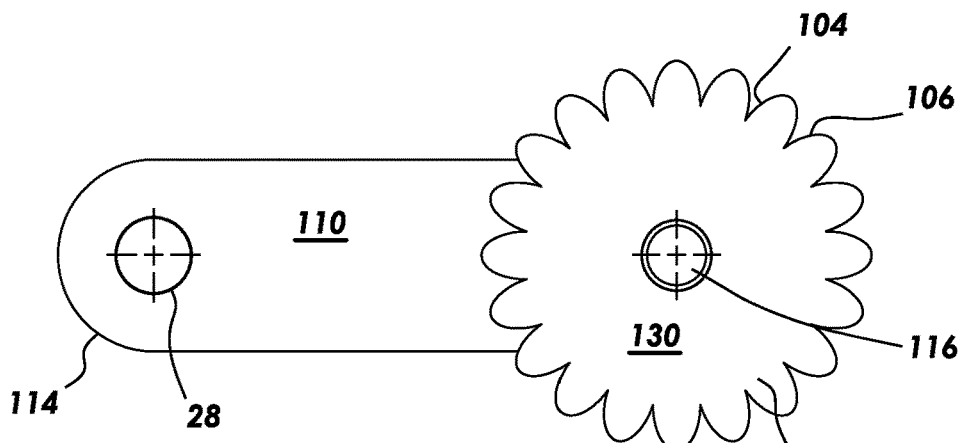
Figure 9C:
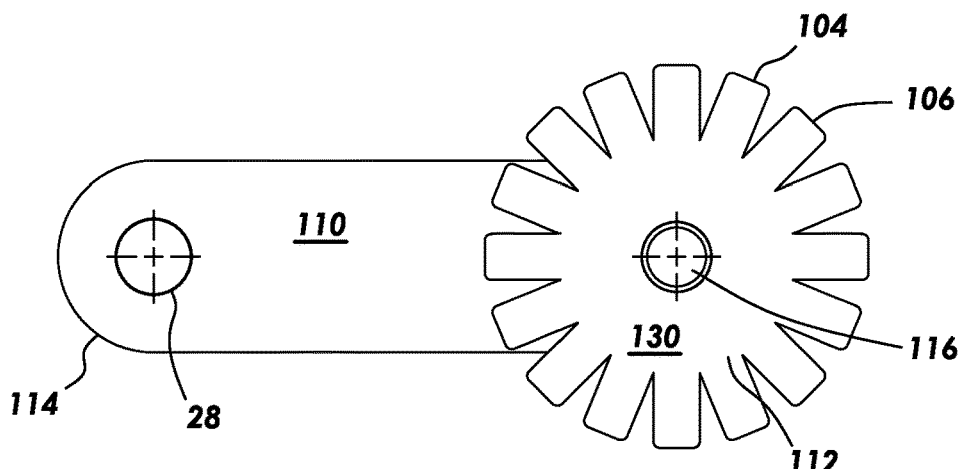

FIGS. 9A-9C show three example patterns 106 that can be used for the adjustable height mechanisms 100 but others are also feasible and anticipated by this disclosure. It should be understood that the patterns 106 shown in FIGS. 9A-9C correspond to complimentary shaped patterns 108 of the moveable plate's 120 recess 109, even though these patterns 108 are not explicitly shown. The pattern 106 in FIG. 9A is formed by a plurality of triangle shaped teeth. The pattern 106 in FIG. 9B is formed by a plurality of rounded end shaped teeth. The pattern 106 in FIG. 9C is formed by a plurality of rectangular shaped teeth. The mating patterns 108 for each one of these patterns 106 is complimentarily shaped so that the pattern 106 can be received in a recess with the respective pattern 108.

FIG. 10A is a representative top view of a mounting assembly 50 of the cart system 10, according to one or more example embodiments. The mounting assembly 50 can include mounting bracket 60 with base plate 61, supports 62, 68, retainers 76, attachment points 43, and a clamping assembly 70 that is rotationally mounted to the support 62. In this configuration, the supports 62, 68 are integral with each other and 62 can be seen a being a portion of the support 68 which is used to restrict left and right movement of the portable tool 200 when it is installed in the mounting assembly 50. A center line 260 is a line that is drawn through the center of each attachment point 43. The clamping assembly 70 is rotationally mounted to the support 62 of the mounting bracket 60 and rotates about an axis 15, which can be offset in an "X" direction (see coordinate key) from the center line 260 by an angle A2. The trigger actuator 74 can be rotationally mounted to the clamp arm 72 of the clamping assembly 70 and rotates about an axis 14, which can be offset in an "X" direction from the center line 260 by an angle A3. It is preferred that the axis 14 is substantially parallel with the axis 15, with angles A2 and A3 being substantially equal. As used herein, "substantially equal" means that a value, such as angle A2 or length L1, is within 10% of another value, such as A3 or L2, respectively. Therefore, if a first angle is within 10% of a second angle, then the first and second angles are substantially equal to each other. It should be understood that the angles A1, A2, or A3 can be "zero." It is not required that these angles be a non-zero value.

FIG. 10B is a representative perspective view of the mounting assembly 50 of FIG. 10A, according to one or more example embodiments. The axis 15 can be offset from the center line 260 in a "Z" direction by an angle A1. The angle of axis 14 can be parallel with the axis 15, with angle A1 being substantially equal to the angle of the axis 14 in the "Z" direction. The clamping assembly 70 can include a locking device 80 that can lock the clamping assembly in an engaged position that would engage the portable tool 200 when the tool 200 is installed in the mounting assembly 50.

Figure 10C:
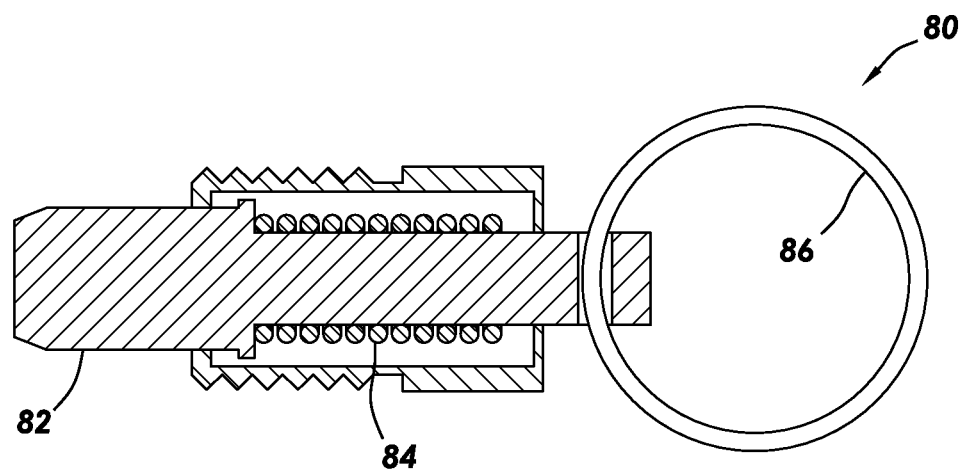
FIG. 10C is a representative partial cross-sectional view of a locking device, according to one or more example embodiments.

FIG. 10C is a representative partial cross-sectional view of the locking device 80, according to one or more example embodiments. The locking device 80 can include a threaded body that can be screwed into a threaded hole in the clamp arm 72. A pin 82 can be biased to an extended position as seen in FIG. 10C. The biasing device 84 can act on features of the pin 82 to urge the pin to the extended position. When the pin 82 is pushed into the body by an opposing force to the biasing device 84, the biasing device 84 is compressed. When the opposing force is removed the pin again extends to the extended position. The opposing force can be applied via the pull feature 86 and/or an object that blocks extension of the pin 82 from the body. It should also be understood that the locking device 80 can be a scaffolding pin, a quick release pin, a bolt, a thumb screw, or another fastener that can be manually extended (by sliding, screwing, twisting, etc.) into a hole in the clamp arm 70 to engage a retention feature on the mounting bracket when the clamp arm 72 is in an engaged position. Engagement of the retention feature by the locking device 80 can prevent rotation of the clamp assembly 70 to an unengaged position.

Figure 10D:
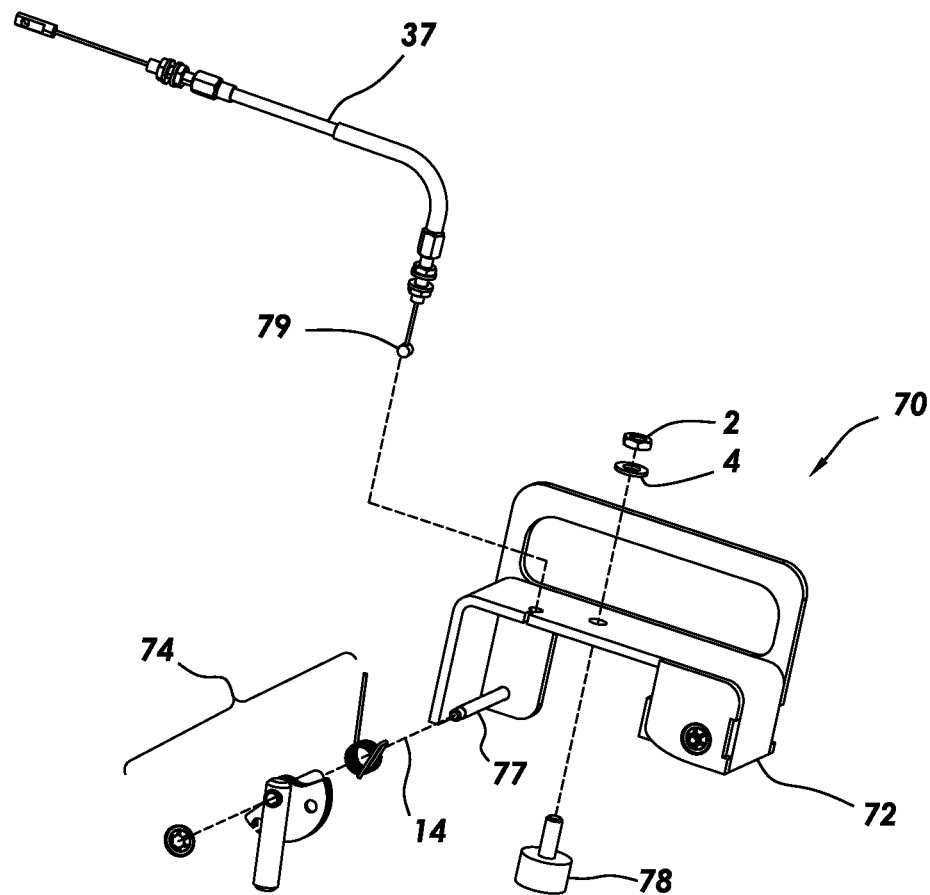
FIG. 10D is a representative exploded perspective view of a clamping device for securing a portable tool to the mounting assembly of FIGS. 10A-10B, according to one or more example embodiments.

FIG. 10D is a representative exploded perspective view of the clamping assembly 70 for securing a portable tool to the mounting assembly 50, according to one or more example embodiments. The clamping assembly 70 can include a trigger actuator 74, an interface to the cable assembly 37 which includes a connection of a trigger actuator that connects to the end of the cable assembly 79. The clamping assembly 70 includes a clamp arm 72 that is rotationally mounted to the support 62. The arm 72 provides structural support for the attachment of the cable assembly 37, the trigger actuator 74, and a bumper 78. The trigger actuator 74 can include a spring to bias the trigger actuator 74 to a disengaged position. The trigger actuator 74 can be rotationally mounted to the clamp arm 72 at a support post 77. Pulling the cable end 79 can rotate the trigger actuator 74 about the post 77 (i.e. about axis 14) to operate a trigger of the portable tool 200. When the cable end is released, the spring can rotate the trigger actuator to the disengaged position. The bumper 78 can be attached to the clamp arm 72 via the nut 2 and washer 4. The bumper 78 is configured to engage a rear portion 204 (e.g. a rear handle) of the portable tool 200 and apply a force to the rear portion 204 when the clamp arm 72 is locked in the engaged position.

Figure 11:
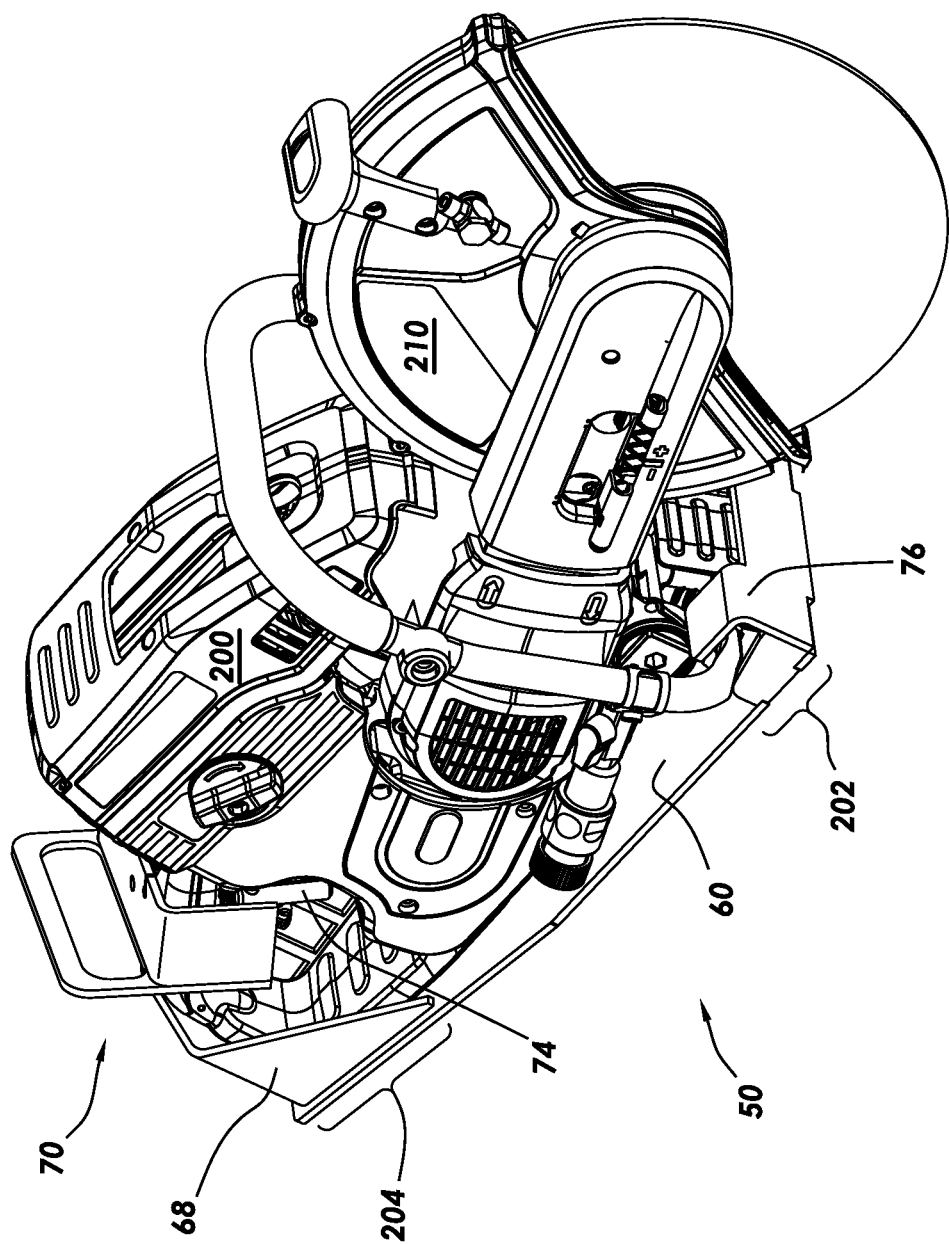
FIG. 11 is a representative perspective view of the mounting assembly of FIG. 10A with a representative portable tool installed in the mounting assembly, according to one or more example embodiments.

FIG. 11 is a representative perspective view of the mounting assembly 50 of FIG. 10A with a representative portable tool 200 installed in the mounting assembly 50, according to one or more example embodiments. A front portion 202 of the portable tool 200 is engaged with the retainers 76 at a front of the mounting assembly 50. A rear portion 204 can be engaged with the supports 68 and the clamping assembly 70. The clamping assembly 70 can engage the rear portion 204 to secure the portable tool 200 to the mounting assembly 50 within the supports 62, 68.

FIG. 12A is a representative perspective partial translucent view of the clamping assembly 70 rotationally mounted to the support 62 of the mounting bracket 60 and in an open or disengaged position, according to one or more example embodiments. A portion of the clamping assembly 70 forms a grip 73, and the grip 73 is shown as translucent to allow additional elements of the clamp assembly 70 to be seen, such as supports 64, 66 and rod 69. A portion of the clamp arm 72 can straddle the supports 64, 66 with the rod 69 extending through both sides of the clamp arm 72 and the supports 64, 66 as shown. A keeper 54 can be installed on both ends of the rod 69 to resist removal of the rod 69. The resilient bumper 78 can be attached to the clamp arm 72 such that the bumper faces the portable tool 200 when the clamping assembly 70 is rotated to an engaged (i.e. closed) position. The bumper 78 can be used to engage the rear portion 204 of the portable tool 200 and can actuate a safety switch 208 on a handle of the portable tool 200. The trigger actuator 74 can be rotationally attached to the clamp arm 72 as described above. The trigger actuator 74 is shown in an open (i.e. disengaged) position.

With the clamping assembly 70 in the disengaged position as shown in FIG. 12A, the pin 82 of the locking device 80 is held inside the locking device 80 the support 64 with the biasing device 84 urging the pin 82 against the support 64. Rotating the clamping assembly 70 in a clockwise direction can rotate the locking device 80 past a retention feature 140. When the locking device passes the retention feature 140, the pin 82 will extend from the locking device 80 thereby preventing a counter-clockwise rotation of the clamp assembly 70 by engaging the retention feature 140. Further clockwise rotation of the clamp assembly 70 may be allowed, but counter-clockwise rotation past the retention feature is prevented, until the locking device 80 is disengaged from the retention feature 140. The clamping assembly 70 is in a locked (or engaged) position with the locking device 80 is engaged with the retention feature 140.

The retention feature 140 can be anything that can abut (or engage) the locking device 80 when the pin 82 of the locking device is extended. FIGS. 12B-12D are representative illustrations of various possible retention features of the clamping assembly 70. The FIGS. 12B-12D are various configurations of the Detail 12B shown in FIG. 12A, according to one or more example embodiments. In these configurations, the rod 69 is positioned between the retention feature 140 and the support.

FIGS. 12B-12D show the support 64 attached to the support 62 and the rod 69 disposed between the retention feature 140 and the support 62. The clamp arm 72 rotates about the rod 69 (and axis 15). With the clamp assembly 70 in the disengaged position, as shown in FIG. 12A, the pin 82 of the locking device 80 can be at a position 142 on the surface 54 of the support 64. In position 142, the pin is forced to remain within the locking device 80, because the surface 54 impedes extension of the pin 82. The biasing device 84 can urge the pin 82 against the surface 54. When pin 82 is rotated clockwise with the clamping assembly 70 to a position 144, as indicated by the arrow 95, the pin 82 can extend past the surface 54 and engage the retention feature 140. The clamping assembly 70 will be prevented from rotating counter-clockwise (i.e. opposite the arrow 95) by the engagement of the pin 82 with the retention feature 140 until the pin 82 is retracted into the locking device 80. Therefore, if an operator desires to rotate the clamping assembly 70 from the engaged (or locked position) back to a disengaged (or unlocked position), then the operator can apply a pulling force to the pull feature 86, which retracts the pin 82 past the surface 54 and into the locking device 80. The locking device 80 is then disengaged from the retention feature 140 and allows the clamping assembly to be rotated counter-clockwise to the disengaged position as shown in FIG. 12A.

FIG. 12B shows a retention feature 140 that is a slot formed through an edge of the support 64. This slot (also seen in the detail 12B of FIG. 12A) is wider than a diameter of the pin 82, so the pin 82 has clearance to extend into the slot at position 144 and engage the retention feature 140.

FIG. 12C shows a retention feature 140 that is a reduced thickness portion of the support 64 at the corner as shown. The reduced thickness portion is recessed below the surface 54 such that there is a ridge that can engage the pin 82 at position 144. The reduced thickness portion can have a thickness of "zero" such that the corner of the support 64 is removed to form the retention feature 140. However, the reduced thickness portion can have a thickness that is greater than "zero" but less than a thickness of the portion of the support 64 that is outside the reduced thickness portion. When the pin 82 rotates to the position 144, the pin 82 can extend into the reduced thickness portion and engaged with the retention feature 140.

FIG. 12D shows a retention feature 140 that is a circular recess formed through the support 64 at the position 144. This circular recess can be a reduced thickness portion or a hole through the support 64. The circular recess has a larger diameter wider than a diameter of the pin 82, so the pin 82 has clearance to extend into the circular recess at position 144 and engage the retention feature 140.

Figure 13A:
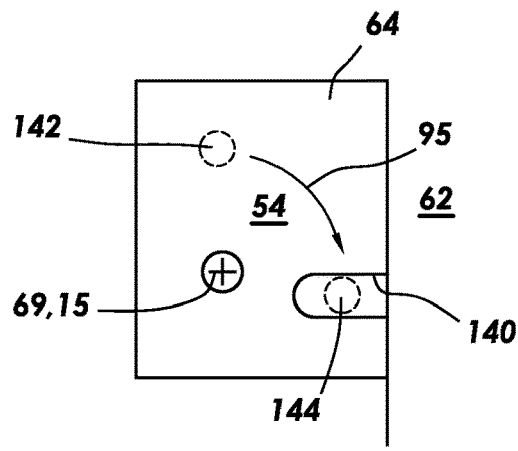
FIGS. 13A-13C are representative front views of various retention features of the clamping device with reference to the detail 12B indicated in FIG. 12A, according to one or more example embodiments.
Figure 13B:
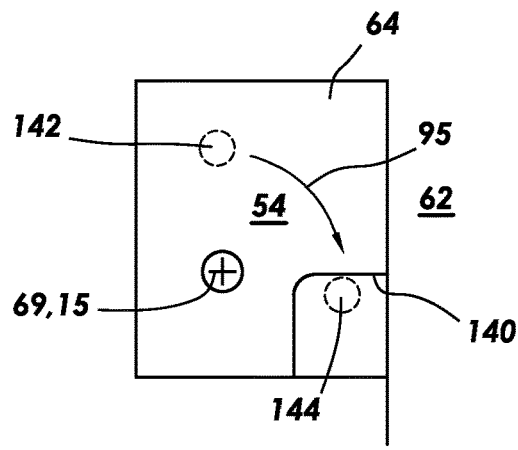
Figure 13C:
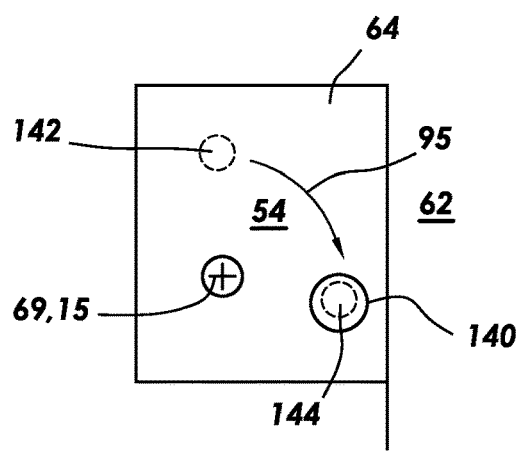

FIGS. 13A-13C are similar to FIGS. 12B-12D with the support 64 attached to the support 62. However, the rod 69 is disposed between the support 62 and the retention feature 140. The pin 82 can be at position 142 on the surface 54 and rotated clockwise (arrow 95) to a position 144 where the pin 82 can extend past the surface 54 and engage the retention feature 140. FIG. 13A shows the retention feature 140 as a slot which is as explained above with reference to FIG. 12B. FIG. 13B shows the retention feature 140 as a reduced thickness portion which is as explained above with reference to FIG. 12C. FIG. 13C shows the retention feature 140 as a circular recess with reduced thickness which is as explained above with reference to FIG. 12D.

EMBODIMENTS

Embodiment 1

A system comprising:
a cart;
a mounting bracket configured to be removably attached to the cart and configured to receive a portable tool, the mounting bracket comprising:
one or more retainers configured to engage a front portion of the portable tool; and
a clamp assembly rotationally attached to the mounting bracket, the clamp assembly configured to engage a rear portion of the portable tool when the clamp assembly is in a locked position, such that further rotation of the clamp assembly is prevented and the portable tool is secured to the mounting bracket.

Embodiment 2

The system of embodiment 1, wherein the clamp assembly comprises a clamp rotationally attached to the mounting bracket and a locking device that engages a retention feature on the mounting bracket when the clamp is rotated to the locked position.

Embodiment 3

The system of embodiment 2, wherein disengagement of the locking device from the retention feature enables rotation of the clamp assembly and allows removal of the portable tool from the mounting bracket.

Embodiment 4

The system of embodiment 2, wherein the locking device comprises a biasing device mechanically coupled to a pin, wherein the biasing device urges the pin against a surface of the mounting bracket and allows rotation of the clamp assembly when the clamp assembly is in an unlocked position, wherein the pin is urged past the surface into engagement with the retention feature when the clamp assembly is rotated to the locked position, and wherein the engagement of the pin with the retention feature prevents rotation of the clamp assembly, at least in one direction.

Embodiment 5

The system of embodiment 4, wherein the retention feature is a hole in the mounting bracket that receives the pin when the clamp assembly is in the locked position.

Embodiment 6

The system of embodiment 4, wherein the retention feature is a shoulder on a surface of the mounting bracket that engages the pin when the clamp assembly is in the locked position.

Embodiment 7

The system of embodiment 4, wherein the retention feature is a recess in the surface of the mounting bracket that receives the pin when the clamp assembly is in the locked position.

Embodiment 8

The system of embodiment 4, wherein compressing the biasing device disengages the pin from the retention feature and enables rotation of the clamp assembly to the unlocked position.

Embodiment 9

The system of embodiment 1, wherein the clamp assembly rotates about a first axis that is angled away from a forward direction of travel of the cart and angled away from a direction that is perpendicular to the forward direction of travel of the cart.

Embodiment 10

The system of embodiment 1, wherein the clamp assembly further comprises an actuator configured to operate a trigger of the portable tool.

Embodiment 11

The system of embodiment 10, wherein the actuator is operated remotely.

Embodiment 12

The system of embodiment 10, wherein the actuator is rotationally attached to the clamp assembly and rotates about a second axis that is angled away from a forward direction of travel of the cart and angled away from a direction that is perpendicular to the forward direction of travel of the cart.

Embodiment 13

The system of embodiment 12, wherein the second axis is parallel with a first axis of rotation of the clamp assembly.

Embodiment 14

The system of embodiment 10, wherein the mounting bracket is configured to receive the portable tool when the clamp assembly is rotated to an open position and the actuator is rotated to a disengaged position.

Embodiment 15

The system of embodiment 10, wherein the clamp assembly is configured to apply a compression force on the rear portion, and to maintain the compression force when the clamp assembly is in the locked position.

Embodiment 16

The system of embodiment 15, wherein the clamp assembly is configured to apply the compression force to a safety switch on the rear portion and enable operation of the portable tool when the clamp assembly is in the locked position.

Embodiment 17

A system comprising:
- an adjustable arm with a first end and a second end, with the first end opposite the second end, the first end being rotationally attached to the body of the cart at a forward position such that the adjustable arm rotates about an axis at the forward position, and a front wheel being rotationally attached to the second end;
- a circular disk fixedly attached to the first end of the adjustable arm such that the circular disk rotates with the adjustable arm about a first axis, the circular disk having a first pattern formed around a perimeter of the circular disk; and
- a plate moveably attached to the body, the plate having a recess formed in a surface of the plate, the recess having a second pattern that mates with the first pattern, with rotation of the adjustable arm about the first axis being prevented when the circular disk having the first pattern is engaged in the recess having the second pattern, and
- rotation of the adjustable arm about the first axis being permitted when the circular disk is disengaged from the recess.

Embodiment 18

The system of embodiment 17, wherein the plate is moved relative to the body and the circular disk by a remotely operated actuator.

Embodiment 19

The system of embodiment 18, wherein the cart comprises a handle, and wherein the remotely operated actuator is a cable actuator with one end connected to the plate and an opposite end connected to a manual control on the handle.

Embodiment 20

The system of embodiment 18, wherein operation of the remotely operated actuator moves the plate laterally relative to the body and the circular disk, and wherein the lateral movement of the plate engages or disengages the circular disk and the recess.

Embodiment 21

The system of embodiment 20, wherein rods are fixedly attached to the body, wherein the plate is slidably attached to the rods by extending through holes in the plate, the holes have a larger diameter than the rods, wherein a biasing device that engages the plate, wherein the biasing devices urge the plate into engagement with the circular disk, and the actuator is configured to apply a force to the plate that acts against the biasing devices and disengages the plate from the circular disk when the force applied to the plate by the actuator overcomes a force applied to the plate by the biasing devices.

Embodiment 22

The system of embodiment 18, wherein operation of the remotely operated actuator rotates the plate relative to the body, and the rotation of the plate engages or disengages the circular disk and the recess.

Embodiment 23

The system of embodiment 22, wherein the plate is rotationally mounted to the body at one end and a biasing device acts on an opposite end, wherein the biasing device urges the plate to rotate in one direction into engagement with the circular disk and the actuator is configured to apply a force to the plate that acts against the biasing device to disengage the plate from the circular disk by rotating the circular disk in an opposite direction.

Embodiment 24

The system of embodiment 17, further comprising one or more rear wheels rotationally attached at a rearward position on the body of the cart, wherein the cart is configured to travel along a surface while supporting the portable tool, and wherein the rotation of the adjustable arm about the first axis adjusts a height of the body from the surface.

Embodiment 25

The system of embodiment 24, wherein the height of the body is locked when the circular disk is engaged with the recess.

Embodiment 26

The system of embodiment 25, where the portable tool is a portable sawing tool and adjusting the height adjusts a depth of cut of the portable sawing tool.

The invention claimed is:

1. A system comprising:
   a cart;
   a mounting bracket configured to be removably attached to the cart and configured to receive a portable tool, the mounting bracket comprising:
      one or more retainers configured to engage a front portion of the portable tool; and
      a clamp assembly rotationally attached to the mounting bracket, the clamp assembly configured to engage a rear portion of the portable tool when the clamp assembly is in a locked position, such that further rotation of the clamp assembly is prevented and the portable tool is secured to the mounting bracket, wherein the clamp assembly rotates about a first axis that is angled away from a forward direction of travel of the cart and angled away from a direction that is perpendicular to the forward direction of travel of the cart.

2. The system of claim 1, wherein the clamp assembly comprises a clamp rotationally attached to the mounting bracket and a locking device that engages a retention feature on the mounting bracket when the clamp is rotated to the locked position.

3. The system of claim 2, wherein disengagement of the locking device from the retention feature enables rotation of the clamp assembly and allows removal of the portable tool from the mounting bracket.

4. A system comprising:
   a cart;
   a mounting bracket configured to be removably attached to the cart and configured to receive a portable tool, the mounting bracket comprising:
      one or more retainers configured to engage a front portion of the portable tool; and
      a clamp assembly rotationally attached to the mounting bracket, the clamp assembly configured to engage a rear portion of the portable tool when the clamp assembly is in a locked position, such that further rotation of the clamp assembly is prevented and the portable tool is secured to the mounting bracket, wherein the clamp assembly comprises a clamp rotationally attached to the mounting bracket and a locking device that engages a retention feature on the mounting bracket when the clamp is rotated to the locked position,
   wherein the locking device comprises a biasing device mechanically coupled to a pin, wherein the biasing device urges the pin against a surface of the mounting bracket and allows rotation of the clamp assembly when the clamp assembly is in an unlocked position,
   wherein the pin is urged past the surface into engagement with the retention feature when the clamp assembly is rotated to the locked position, and
   wherein the engagement of the pin with the retention feature prevents rotation of the clamp assembly, at least in one direction.

5. The system of claim 4, wherein the retention feature is one of a hole in the mounting bracket that receives the pin when the clamp assembly is in the locked position, or a shoulder on a surface of the mounting bracket that engages the pin when the clamp assembly is in the locked position, or a recess in the surface of the mounting bracket that receives the pin when the clamp assembly is in the locked position.

6. The system of claim 4, wherein compressing the biasing device disengages the pin from the retention feature and enables rotation of the clamp assembly to the unlocked position.

7. The system of claim 1, wherein the clamp assembly further comprises a remote actuator configured to operate a trigger of the portable tool.

8. The system of claim 7, wherein the remote actuator is rotationally attached to the clamp assembly and rotates about a second axis that is angled away from a forward direction of travel of the cart and angled away from a direction that is perpendicular to the forward direction of travel of the cart.

9. The system of claim 8, wherein the second axis is parallel with a first axis of rotation of the clamp assembly.

10. The system of claim 7, wherein the mounting bracket is configured to receive the portable tool when the clamp assembly is rotated to an open position and the remote actuator is rotated to a disengaged position.

11. The system of claim 7, wherein the clamp assembly is configured to apply a compression force on the rear portion, and to maintain the compression force when the clamp assembly is in the locked position.

12. The system of claim 11, wherein the clamp assembly is configured to apply the compression force to a safety switch on the rear portion and enable operation of the portable tool when the clamp assembly is in the locked position.

13. A system comprising:
   an adjustable arm with a first end and a second end, with the first end opposite the second end, the first end being rotationally attached to a body of a cart at a forward position such that the adjustable arm rotates about an axis at the forward position, and a front wheel being rotationally attached to the second end;
   a circular disk fixedly attached to the first end of the adjustable arm such that the circular disk rotates with the adjustable arm about a first axis, the circular disk having a first pattern formed around a perimeter of the circular disk; and
   a plate moveably attached to the body, the plate having a recess formed in a surface of the plate, the recess having a second pattern that mates with the first pattern,
      with rotation of the adjustable arm about the first axis being prevented when the circular disk having the first pattern is engaged in the recess having the second pattern, and
      rotation of the adjustable arm about the first axis being permitted when the circular disk is disengaged from the recess.

14. The system of claim 13, wherein the plate is moved relative to the body and the circular disk by a remotely operated actuator.

15. The system of claim 14, wherein operation of the remotely operated actuator moves the plate laterally relative to the body and the circular disk, and wherein the lateral movement of the plate engages or disengages the circular disk and the recess.

16. The system of claim 15, wherein rods are fixedly attached to the body, wherein the plate is slidably attached to the rods by extending through holes in the plate, the holes have a larger diameter than the rods, wherein a biasing device urges the plate into engagement with the circular disk, and the remotely operated actuator is configured to apply a force to the plate that acts against the biasing device and disengages the plate from the circular disk when the force applied to the plate by the remotely operated actuator overcomes a force applied to the plate by the biasing device.

17. The system of claim 13, further comprising one or more rear wheels rotationally attached at a rearward position on the body of the cart, wherein the cart is configured to travel along a surface while supporting a portable tool, and wherein the rotation of the adjustable arm about the first axis adjusts a height of the body from the surface.

18. The system of claim 17, wherein the height of the body is locked when the circular disk is engaged with the recess.

19. The system of claim 18, where the portable tool is a portable sawing tool and adjusting the height adjusts a depth of cut of the portable sawing tool.

* * * * *